United States Patent
Gomez et al.

(10) Patent No.: US 12,189,901 B2
(45) Date of Patent: Jan. 7, 2025

(54) SPLIT DISPLAY DRIVER CIRCUITRY TO MITIGATE TOUCH SENSING SYSTEM INTERACTION

(71) Applicant: Apple Inc., Cupertino, CA (US)

(72) Inventors: Jason N Gomez, Campbell, CA (US); Hyunwoo Nho, Palo Alto, CA (US); Jason C Hu, Palo Alto, CA (US); Kwang Soon Park, San Ramon, CA (US); Kyung Wook Kim, Saratoga, CA (US); James E Brown, San Jose, CA (US); Jie Won Ryu, San Jose, CA (US); Myungjoon Choi, San Diego, CA (US); Yao Shi, Sunnyvale, CA (US); ByoungSuk Kim, Palo Alto, CA (US); Vehbi Calayir, Santa Clara, CA (US); Peng Li, San Jose, CA (US); Evan P Donoghue, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/339,646

(22) Filed: Jun. 22, 2023

(65) Prior Publication Data
US 2024/0028162 A1    Jan. 25, 2024

Related U.S. Application Data

(60) Provisional application No. 63/391,702, filed on Jul. 22, 2022.

(51) Int. Cl.
*G06F 3/041*    (2006.01)

(52) U.S. Cl.
CPC ................ *G06F 3/04186* (2019.05)

(58) Field of Classification Search
CPC ............ G06F 3/04186; G06F 3/04184; G06F 3/0443; G06F 3/0446; G06F 3/0412
See application file for complete search history.

(56) References Cited

U.S. PATENT DOCUMENTS

| | | | |
|---|---|---|---|
| 8,194,063 B2 | 6/2012 | Levey et al. | |
| 9,772,704 B2 * | 9/2017 | Yousefpor | G06F 3/0412 |
| 9,817,512 B1 * | 11/2017 | Kim | G06F 3/044 |
| 9,953,591 B1 * | 4/2018 | Holland | G09G 3/3611 |
| 10,663,787 B2 | 5/2020 | Kim et al. | |
| 10,748,981 B1 * | 8/2020 | Rieutort-Louis | H10K 59/131 |
| 10,845,930 B2 * | 11/2020 | Krah | G06F 3/0446 |
| 10,852,885 B2 | 12/2020 | Lin et al. | |
| 10,963,081 B2 * | 3/2021 | Xiang | H10K 59/131 |

(Continued)

OTHER PUBLICATIONS

International Search Report & Written Opinion for PCT Application No. PCT/US2023/026511 dated Oct. 24, 2023; 13 pgs.

*Primary Examiner* — Ibrahim A Khan
(74) *Attorney, Agent, or Firm* — Fletcher Yoder, P.C.

(57) ABSTRACT

An electronic display may include a touch sensing system configured to perform touch sensing in an active area of the electronic display and display driver circuitry configured to program display pixels of the active area to emit light. The electronic display may also include the active area. The active area may include a first portion and a second portion that are at least partially electrically separated. The display driver circuitry may program the display pixels in the first portion while the touch sensing circuitry may perform touch sensing in the second portion.

27 Claims, 18 Drawing Sheets

(56) References Cited

U.S. PATENT DOCUMENTS

| | | | |
|---|---|---|---|
| 11,320,920 | B2 | 5/2022 | Tang et al. |
| 11,320,934 | B1* | 5/2022 | Vaze ..................... G06F 3/0445 |
| 2014/0267067 | A1* | 9/2014 | Fuller ................. G06F 3/04184 |
| | | | 345/173 |
| 2015/0049041 | A1* | 2/2015 | Yousefpor ............. G06F 3/0445 |
| | | | 345/174 |
| 2015/0049061 | A1* | 2/2015 | Takagi .................... G09G 5/18 |
| | | | 345/174 |
| 2015/0091851 | A1 | 4/2015 | Reynolds |
| 2016/0091998 | A1* | 3/2016 | Chyan ................ G06F 3/04883 |
| | | | 345/174 |
| 2016/0370913 | A1* | 12/2016 | Xie ..................... G02F 1/13338 |
| 2017/0063351 | A1 | 3/2017 | Kurokawa |
| 2017/0123552 | A1* | 5/2017 | Brunet ................. G06F 3/04184 |
| 2018/0114506 | A1* | 4/2018 | Takahashi ........... G06F 3/04166 |
| 2019/0204954 | A1* | 7/2019 | Kim ..................... H10K 59/129 |
| 2020/0103993 | A1* | 4/2020 | Krah ................... G06F 3/04182 |
| 2021/0191554 | A1* | 6/2021 | Jun ..................... G09G 3/3674 |
| 2021/0278920 | A1* | 9/2021 | Tang ..................... H10K 59/126 |
| 2022/0069027 | A1 | 3/2022 | Wang et al. |
| 2022/0352286 | A1* | 11/2022 | Mugiraneza .......... G06F 3/0412 |
| 2023/0084423 | A1 | 3/2023 | Choi et al. |
| 2023/0143393 | A1* | 5/2023 | Ha .......................... G06F 3/044 |
| | | | 345/173 |
| 2023/0152926 | A1* | 5/2023 | Yoshimoto ................ G06T 7/20 |
| | | | 345/175 |
| 2023/0217779 | A1* | 7/2023 | Kim ..................... G06F 3/0412 |
| | | | 257/72 |
| 2024/0019952 | A1* | 1/2024 | Xiang .................. G06F 3/0446 |

\* cited by examiner

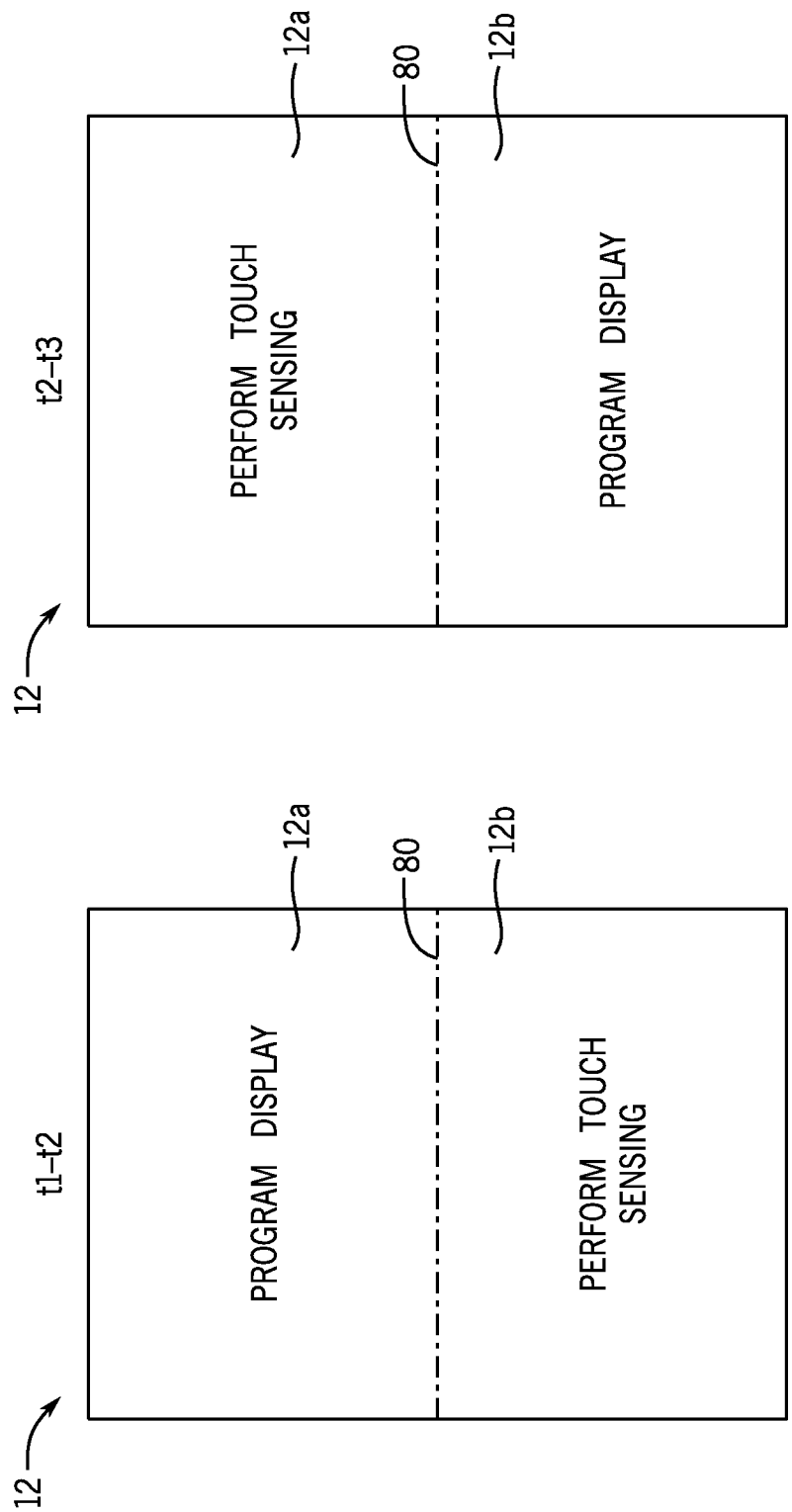

SPLIT DISPLAY DRIVER CIRCUITRY TO MITIGATE TOUCH SENSING SYSTEM INTERACTION

CROSS-REFERENCE TO RELATED APPLICATION

This application claims priority to U.S. Patent Application No. 63/391,702, filed on Jul. 22, 2022, titled "Split Display Circuitry to Mitigate Touch Sensing System Interactions," which is hereby incorporated by reference in its entirety for all purposes.

SUMMARY

The present disclosure relates generally to electronic devices with display panels with a touch sensing system and display driver circuitry, and more particularly, to splitting the display driver circuitry to mitigate touch sensing system interaction.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic displays may display images that present visual representations of information. Accordingly, numerous electronic systems—such as computers, mobile phones, portable media devices, tablets, televisions, virtual-reality headsets, and vehicle dashboards, among many others often include or use electronic displays. An electronic display may include many thousands to millions of display pixels. In any case, an electronic display may generally display an image by actively controlling light emission (e.g., luminance) from its display pixels.

An electronic display may take a variety of forms. For example, an electronic display may be an organic light-emitting diode (OLED) display. The OLED display may include display driver circuitry and an active area having a matrix of OLED display pixels connected to cathodes and anodes. The display driver circuitry may receive image data and program the electronic display to display image content based on the image data. The display driver circuitry programs the display pixels with data signals indicative of the image content. The display driver circuitry may subsequently provide an emission signal to the display pixels, causing the display pixels to emit light.

Many electronic displays may also include a touchscreen functionality that allows a user to interact with the electronic display. For example, the electronic display may include a touch sensing system that operates to receive user input (e.g., finger, pen) in an active area. However, the operation of the touch sensing system may generate electrical signals (e.g., noise), which may interfere with the driving signals (e.g., data signal, emission signal) from the display driver circuitry. For example, noise from the touch sensing system may interfere with the display driving signals, resulting in image artifacts within the image content. In another example, the display driving signals may interfere with the touch sensing system. In other words, crosstalk between display driver circuitry and the touch sensing system may affect the operation of the electronic display.

Accordingly, the present disclosure provides techniques for mitigating touch sensing system interactions by splitting the electronic display. The electronic display may be any suitable electronic display (e.g., an OLED display, a micro-LED display, a liquid crystal display (LCD)). The electronic display may be split into multiple portions that are at least partially isolated from one another to reduce or eliminate crosstalk between the effect of driving the electronic display with the display driver circuitry and sensing touch on the electronic display from the touch sensing system. The display driver circuitry may program the display pixels in one portion of the electronic display while the touch sensing system may operate in a second portion. Thus, electromagnetic signals produced by programming the display pixels in the first portion may have a reduced impact on the operation of the touch sensing system operating in the second portion, and vice versa.

The electronic display may be split into any suitable number and arrangement of different portions. In some examples, the electronic display may be split into a left portion and a right portion, or may be split into more than two portions (e.g., three portions, four portions, and so forth). For ease of explanation, this disclosure may refer to different portions as a "top portion" and a "bottom portion," but it may be appreciated that any suitable number and arrangement of different portions may be used. Consider an example in which the electronic display may be split into a top portion and a bottom portion. For one period, the display driver circuitry may operate in the top portion while the touch sensing system may operate in the bottom portion. For another period, the display driver circuitry may operate in the bottom portion while the touch sensing system may operate in the top portion. In this way, electrical signals generated by programming the electronic display may be largely contained within a first portion of the electronic display and electrical signals from touch sensing may be largely contained within a second portion of the electronic display. Accordingly, crosstalk between the touch sensing system and the display pixels of the display panel may be reduced or eliminated. When the electronic display is split into more than two portions, a first set of one or more portions of the electronic display may be programmed with image data while touch sensing operations occur on a second set of one or more portions of the electronic display.

Due to the split, the top portion and the bottom portion of the electronic display may come to have different properties (e.g., luminance, voltage, noise). For example, different portions of the electronic display may have non-idealities due to process, voltage, or temperature (PVT) differences. This could produce image artifacts if the top portion may display a first luminance different from a second luminance of the second portion. Image content spanning the two portions may be darker in one portion and lighter in another. Thus, the image content could appear to have an image artifact, such as a line at a connection point (e.g., boundary) between the top portion and the bottom portion.

Accordingly, this disclosure also describes systems and methods to reduce or eliminate image artifacts caused by the display split. For example, for a smoother transition between the top portion and the bottom portion, a dithering band may be placed at a boundary between the top portion and the bottom portion. The dithering band may be calibrated to the electronic display and/or the display driver circuitry to provide a smoother transition from top portion to the bottom portion. For example, the dithering band may be calibrated to transition from the luminance of the top portion to the luminance of the bottom portion. The dithering band may have a first edge overlapping the top portion and a second edge overlapping the bottom portion. For example, the dithering band may be one pixel above the boundary and one pixel below boundary. The dithering band may dither, or alternate, between the luminance of the top portion and the luminance of the bottom portion. As such, the dithering band may provide a gradual transition between the first luminance of the top portion and the second luminance of the bottom portion resulting in a smoother transition.

In another example, the boundary between the top portion and the bottom portion may be a zig-zag pattern rather than a straight line. The electronic display may be divided into multiple columns. A first column may be shifted upwards, a second column may be shifted downwards, a third column may be shifted upwards, a fourth column may be shifted downwards, and so on. Other patterns (e.g., up, up, down, up, down, down, up, down, up, up; a random shifting), as well as different degrees of shifting (e.g., one pixel, two pixels, three pixels, and so forth) may be used. This may cause the transition from the top portion to the bottom portion to be less visible.

The electronic display may also be partially split between the top portion and the bottom portion. Instead of the boundary layer between the top portion and the bottom portion, the electronic display may include a connection bridge. As described herein, the cathode may be thinned to create a positive taper structure. The thinned portion of the cathode may be a high-impedance pathway that reduces the ability of signals to transfer from the top portion to the bottom portion without completely preventing their transfer. As such, the connection bridge may reduce or eliminate image artifacts by allowing some signal transfer so that the electrical characteristics of the top portion and bottom portion remain similar enough to produce similar luminance (e.g., so that any differences are less visible or imperceptible to the human eye). Accordingly, crosstalk between the touch sensing circuitry and the display pixels may be reduced or eliminated while also reducing image variation.

To split the electronic display into multiple portions, one or more components of the electronic display may be split. In an embodiment, power supply circuitry of the display driver circuitry may be split into multiple portions. For example, the cathode may be coupled to voltage power supply circuitry that supplies a voltage ELVSS. This voltage power supply circuitry may be referred to simply as "ELVSS." The cathode and ELVSS may be a coupling pathway between the display driver and the touch sensing system. For example, noise from the touch sensing system may couple to the cathode and ELVSS and interfere with the driving signals of the display driver. This could produce image artifacts within the image content. In another example, the driving signals of the display driver may couple to the cathode and ELVSS and interfere with operation of the touch sensing system, resulting in loss of touch sensitivity or poor touch functionalities. As such, it may be beneficial to split the ELVSS into a first portion and a second portion to limit crosstalk between the display pixels and the touch sensing system.

For example, the ELVSS may be split into a first ELVSS and a second ELVSS. Indeed, the top portion may include the first ELVSS and the bottom portion may include the second ELVSS, or vice versa. In an embodiment, the cathode may be stacked on top of the first ELVSS and the second ELVSS. A surface of the cathode may be patterned with one or more vias to form multiple electrical connections. For example, the surface of the cathode may be patterned by an open mask, a fine metal mask, or a deposition of organic material that may be repellant to the cathode. By patterning the surface of the cathode, multiple low impedance pathways may be created for power delivery. As such, power from the ELVSS may be evenly distributed to the cathode, which may lower overall noise within the electronic display.

Additionally or alternatively, center grounding may ground the first ELVSS and the second ELVSS. For example, a printed circuit board (PCB) with a grounding element may be bonded to a center edge of the electronic device to provide grounding to the ELVSS. The grounding may help remove excess power from the ELVSS which may reduce noise or electrical signals from interfering. In other words, the grounding may discharge excess power from the ELVSS. Further, the center grounding may be useful for grounding a split cathode.

The cathodes of the electronic display may also be split into multiple portions. For example, the cathode may be thinned or disconnected to create the top portion and the bottom portion of the electronic display. The center of the cathode may be laser cut, etched, or otherwise cut to create a first cathode and a second cathode. Additionally or alternatively, portions of the cathode may be thinned to create the positive taper structure. The positive taper structure may create high impedance, thereby limiting signal transfer from the top portion to the bottom portion, or vice versa. However, portions of the cathode that may not be thinned may still provide a low impedance pathway. In an embodiment, the cathode may be disconnected in a negative taper structure. In other words, portions of the cathode may extend above a pixel definition layer (PDL) or be recessed into the PDL to create the negative taper structure or the undercut structure. The disconnect may be a high impedance pathway, thereby containing electrical signals to the top portion and the bottom portion, respectively.

In an embodiment, the data lines of the electronic display may be split. For example, the data lines may be split into top data lines and bottom data lines. By breaking the data lines into multiple components, active cancellation or baseline sniffing may be applied to further reduce noise within the electronic display. Active cancellation may include applying a mitigation signal on a data line in the portion of the display where the touch sensing system may be operated to counteract interference from a data line in another portion of the electronic display. For example, the mitigation signal may be a waveform for noise cancellation. As such, applying the mitigation signal may actively cancel out the noise from the data lines. Baseline sniffing may include performing touch sensing on two or more portions of the electronic display, but using the first portion for touch sensing and the second portion to obtain a baseline parameter of noise. As such, noise detected in the first portion may be baselined (e.g., subtracted) by the baseline parameter of noise detected in the second portion. In this way, noise in a portion of the electronic display may be removed, reduced, or eliminated. As such, splitting the display driver circuitry to create the top portion and the bottom portion of the electronic device may mitigate touch sensing system interactions by splitting the display driver circuitry.

Various refinements of the features noted above may exist in relation to various aspects of the present disclosure. Further features may also be incorporated into these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

FIG. 10 is a block diagram of an operation of the electronic display during a first period, in accordance with an embodiment;

FIG. 11 is a block diagram of an operation of the electronic display during a second period, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
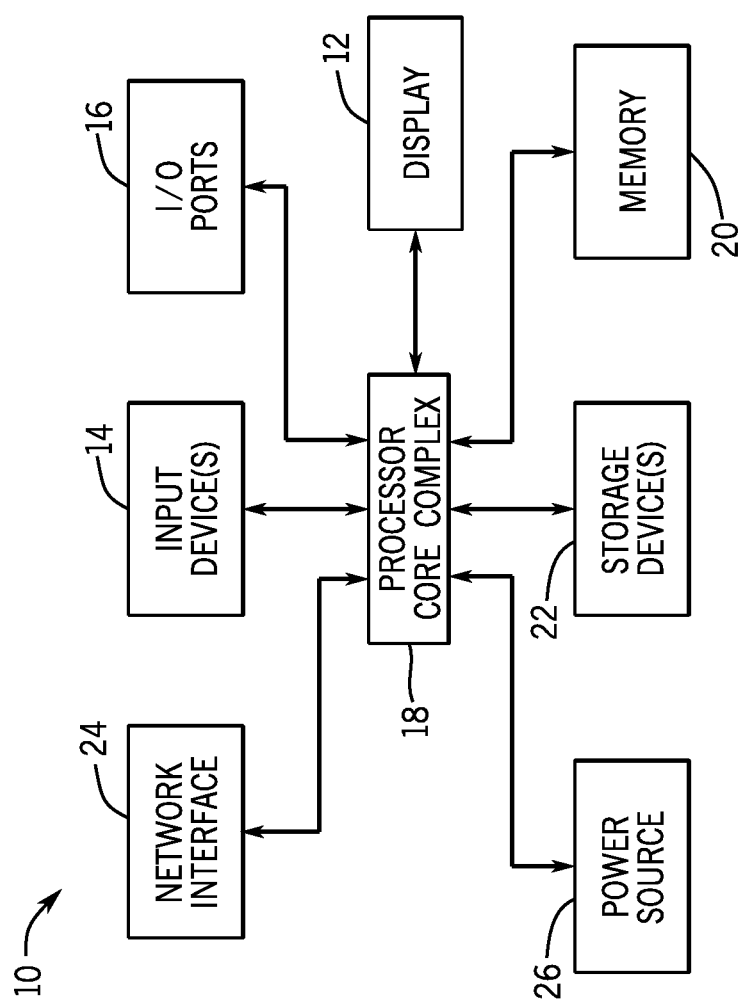
FIG. 1 is a block diagram of an electronic device with an electronic display, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22.

Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light-emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
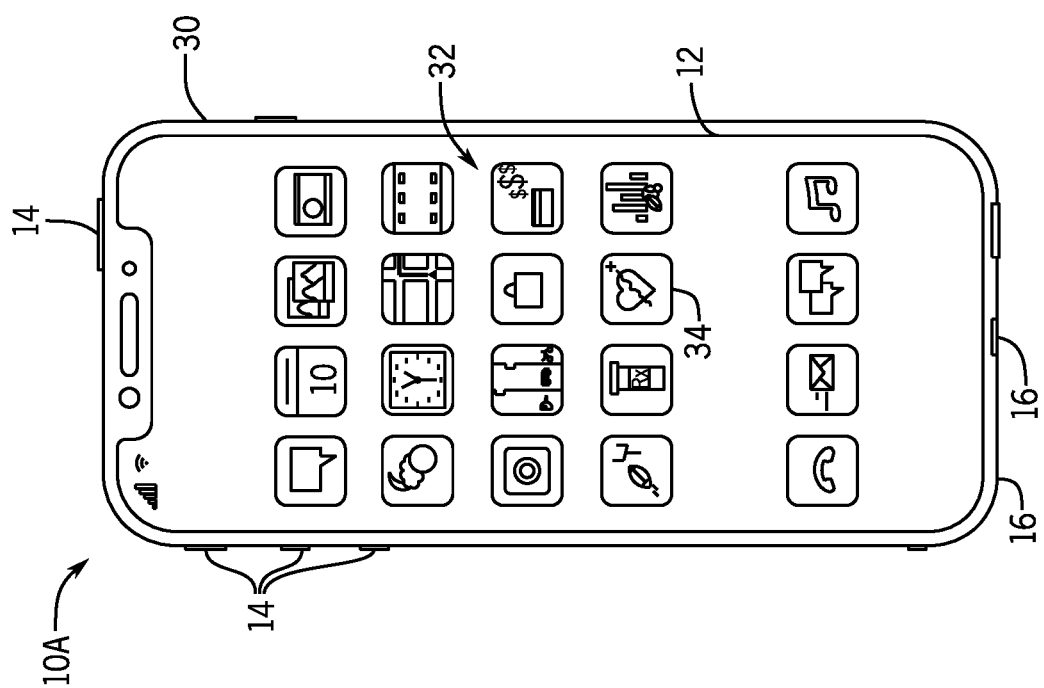
FIG. 2 is an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smartphone, such as any iPhone® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
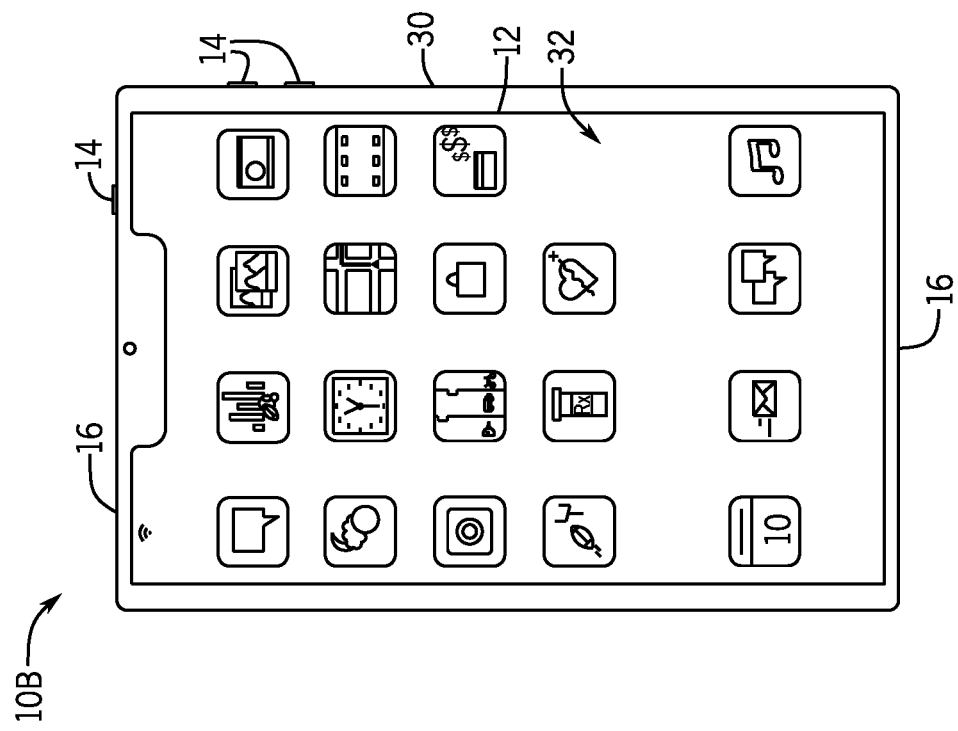
FIG. 3 is another example of the electronic device of FIG. 1, in accordance with an embodiment.
Figure 4:
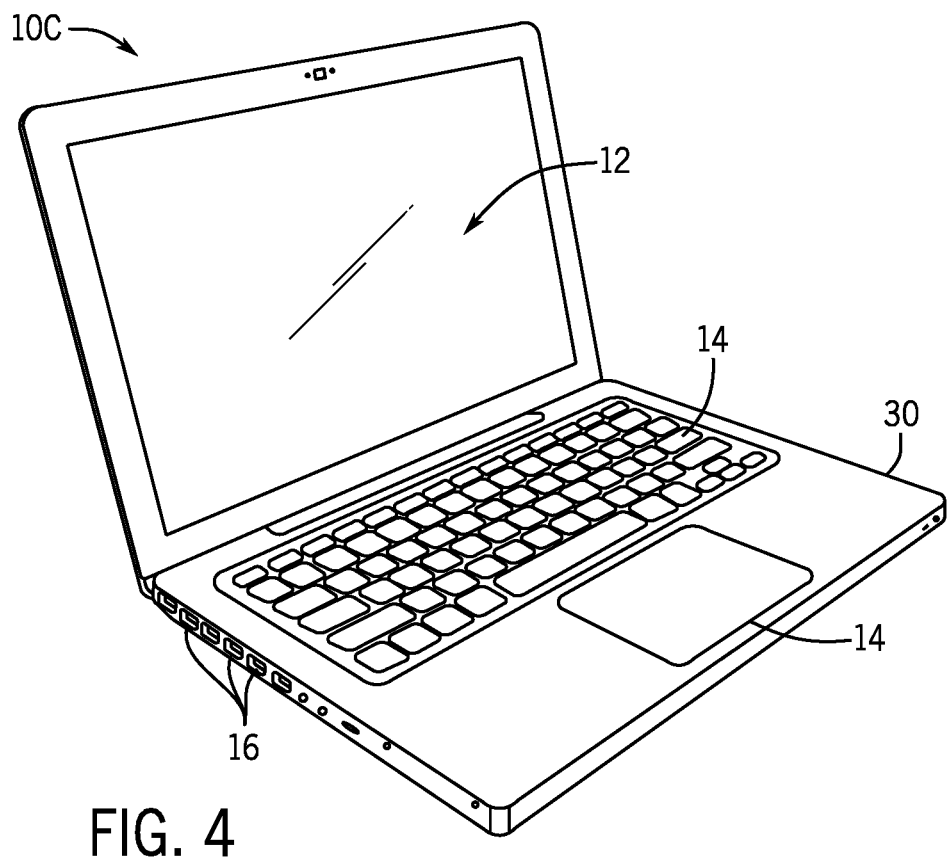
FIG. 4 is another example of the electronic device of FIG. 1, in accordance with an embodiment.
Figure 5:
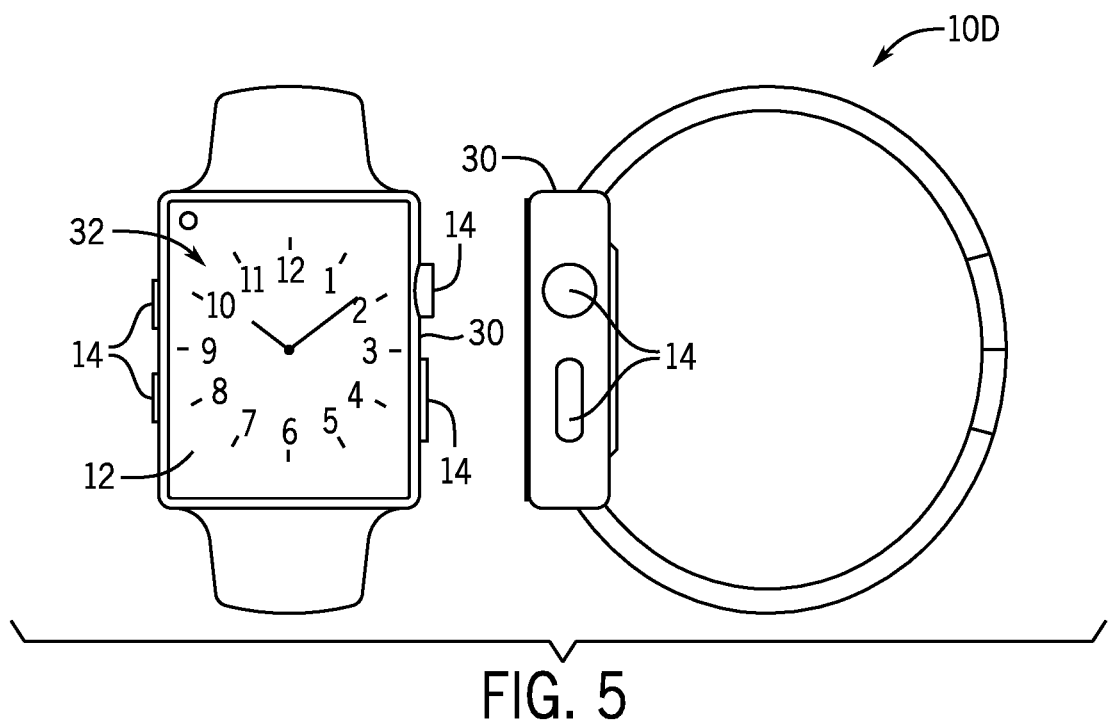
FIG. 5 is another example of the electronic device of FIG. 1, in accordance with an embodiment.

Another example of a suitable electronic device 10, specifically a tablet device 10B, is shown in FIG. 3. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also include an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
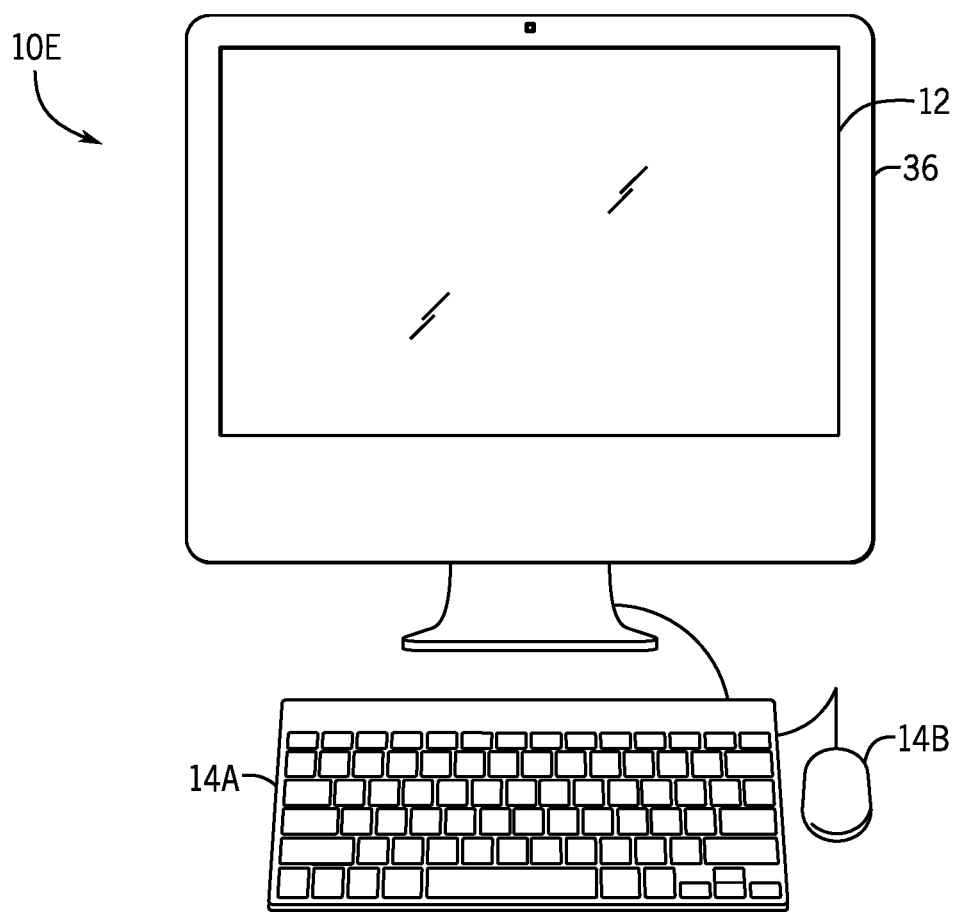
FIG. 6 is another example of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar devices by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
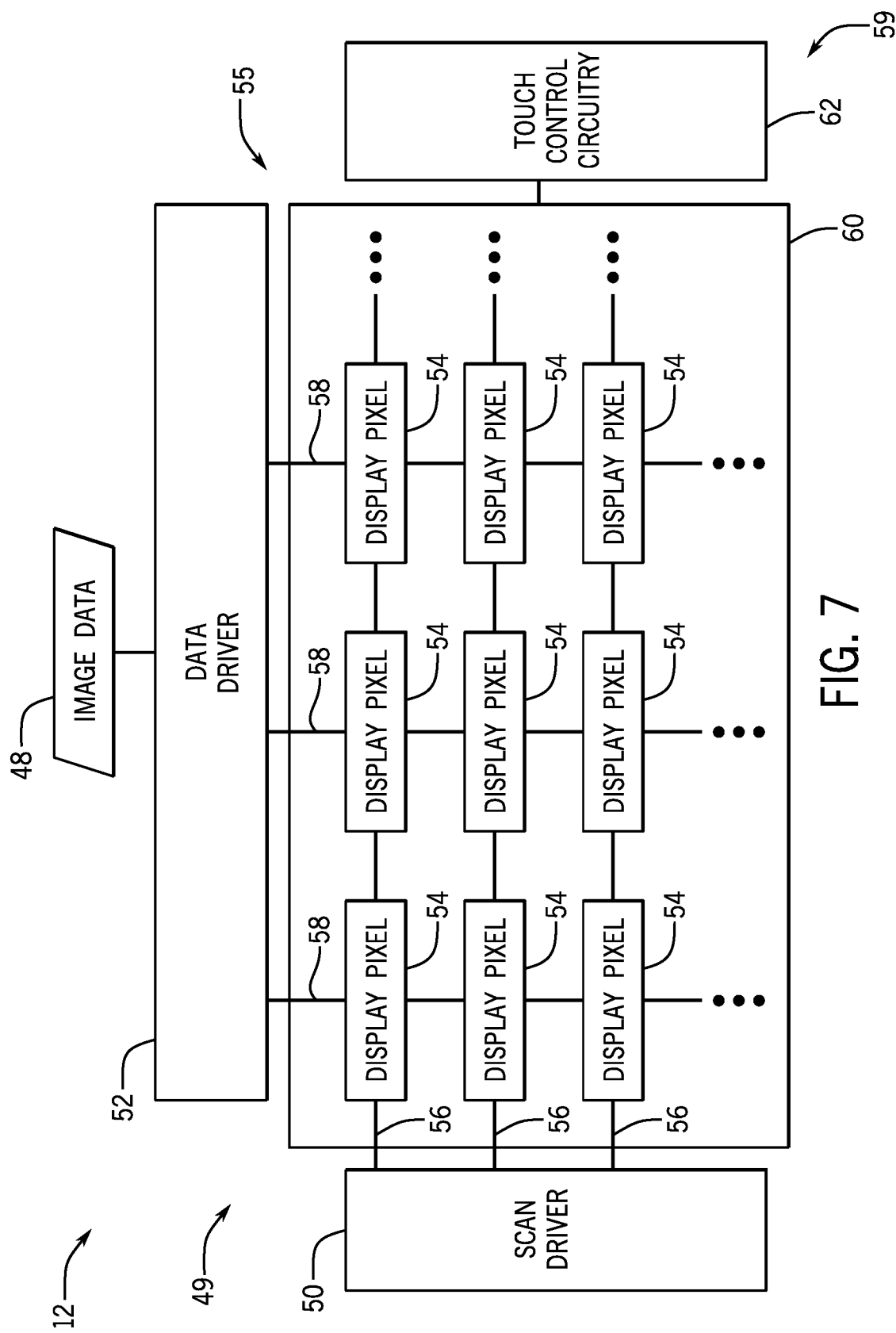
FIG. 7 is a block diagram of the electronic display, in accordance with an embodiment.

As shown in FIG. 7, the electronic display 12 may receive image data 48 for display on the electronic display 12. The electronic display 12 includes display driver circuitry 49 that includes scan driver 50 and data driver 52 that can program the image data 48 onto display pixels 54 of an active area 55. The display pixels 54 may each contain one or more self-emissive elements, such as a light-emitting diodes (LEDs) (e.g., organic light-emitting diodes (OLEDs) or micro-LEDs (μLEDs)). Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), and yellow (Y), or any other suitable color combinations.

The scan driver 50 may provide scan signals (e.g., pixel reset, data enable, on-bias stress) on scan lines 56 to control the display pixels 54 by row. For example, the scan driver 50 may cause a row of the display pixels 54 to become enabled to receive a portion of the image data 48 from data lines 58 from the data driver 52. In this way, an image frame of image data 48 may be programmed onto the display pixels 54 row by row. Other examples of the electronic display 12 may program the display pixels 54 in groups other than by row.

For the display pixels 54 to emit light, the self-emissive elements of the display pixels 54 may receive voltage from a cathode and/or an anode. For example, the self-emissive element may be an OLED. When the voltage is applied across the OLED, the OLED may light up causing the associated display pixel 54 to emit light. To provide the voltage, the cathode and the anode may be coupled to power supply circuitry. The electronic device 10 may include a power management integrated circuitry (PMIC) (e.g., via the processor core complex 18 and/or the processing circuitry) that provides power supply circuitry to the electronic display 12. The PMIC may provide an ELVDD that supplies a low voltage (e.g., ground) to the anode and an ELVSS that supplies a higher voltage to the cathode. The power supply circuitry may have a mesh structure to evenly distribute voltages across the electronic display 12 (e.g., cathode, anode).

Further, a touch sensing system 59 may be integrated into the electronic display 12 to enable touch functionality. The touch sensing system 59 includes touch sensing circuitry 60 to sense user input and touch control circuitry 62 to control the touch sensing circuitry 60. The touch control circuitry 62 causes the touch sensing circuitry 60 to detect touches (e.g., user input) on the electronic display 12 by driving touch signals across certain electrodes (e.g., touch drive electrodes) of the touch sensing circuitry 60 and detecting resulting touch sense signals across certain other electrodes (e.g., touch sense electrodes). As a consequence, the touch sensing circuitry 60 may emit electromagnetic interference and may also be vulnerable to other electromagnetic interference.

Indeed, the touch sensing circuitry 60 and the display pixels 54 may both be located within the active area 55 and receive or carry signals. The touch sensing circuitry 60 may be located above or below the cathode. The touch signals (e.g., noise) from the touch sensing circuitry 60 may couple to the cathode, which may interfere with the data signals of the scan lines 56 and/or the data lines 58. For example, noise from the touch sensing circuitry 60 may interfere with the scan signals or the emission signal driving the display pixels 54, which may cause image artifacts on the electronic display 12. In another example, the electrical signals of the display pixels 54 may interfere with the touch signals of the touch sensing circuitry 60, resulting in loss of touch sensitivity. In other words, there may be crosstalk, or unwanted transfer of electric signals, within the active area 55.

Figure 8:
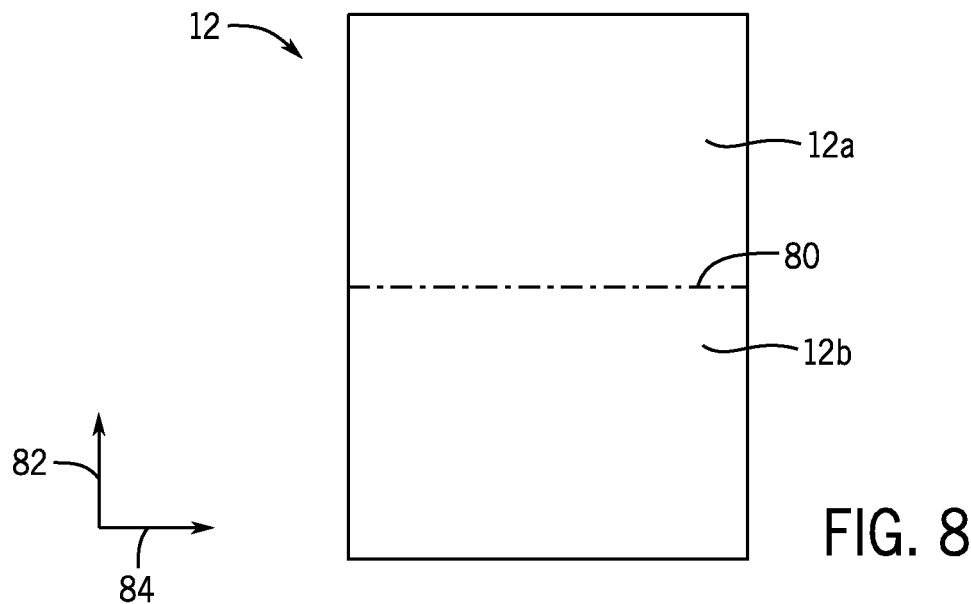
FIG. 8 is a block diagram of the electronic display having a top portion and a bottom portion, in accordance with an embodiment.

With the foregoing in mind, FIG. 8 depicts a block diagram of the electronic display 12. In the example of FIG. 8, the electronic display 12 be split (e.g., divided, partitioned) into a top portion 12a and a bottom portion 12b across a vertical axis 82 or along a horizontal axis 84. For example, the top portion 12a may be a square or a rectangle covering the top half of the electronic display 12 and the bottom portion 12b may cover the bottom half of the electronic display 12. The top portion 12a and the bottom portion 12b may connect (e.g., touch, join, attach) at a boundary 80. The boundary 80 may be at the center of the electronic display 12 (e.g., middle), causing the top portion 12a and the bottom portion 12b to be even, or the boundary 80 may be offset from the center, causing the top portion 12a and the bottom portion 12b to have different dimensions. The boundary 80 may separate (e.g., divide, split) the top portion 12a from the bottom portion 12b to provide at least some electrical isolation between the top portion 12a and the bottom portion 12b. In other words, the boundary 80 may at least partially electrically separate the top portion 12a from the bottom portion 12b. In certain embodiments, the boundary 80 may fully electrically separate the top portion 12a from the bottom portion 12b.

Additionally or alternatively, the electronic display 12 may be split across the horizontal axis 84 or parallel to the vertical axis 82. For example, the electronic display 12 may include a left portion and a right portion. In another embodiment, the electronic display 12 may be split into multiple portions, such as a first portion, a second portion, a third portion, a fourth portion, and so on. The touch control circuitry 62 may operate the touch sensing circuitry 60 within the first portion and the third portion while the display driver circuitry programs the display pixels 54 in the second portion and the fourth portion, or vice versa.

As described herein, the electronic display 12 may include the display driver circuitry 49 and the touch control circuitry 62. At a particular point in time, the display driver circuitry 49 and the touch control circuitry 62 may operate in different portions of the electronic display 12 to reduce crosstalk and/or interference. For example, when the touch control circuitry 62 may perform touch sensing in the top portion 12a, the display driver circuitry 49 may program the display pixels 54 in the bottom portion 12b, or vice versa. In this way, electrical signals from the touch control circuitry 62 may be mostly contained within the top portion 12a, and may not as readily interfere with the electrical signals from the display driver circuitry 49 in the bottom portion 12b. In other words, touch signals from the touch control circuitry 62 may be more isolated within the top portion 12a, and display driving signals from the display driver circuitry 49 may be more isolated within the bottom portion 12b. Accordingly, the boundary 80 may be a barrier between signal transfer, thereby reducing crosstalk between the display pixels 54 and the touch sensing circuitry 60.

Figure 9:
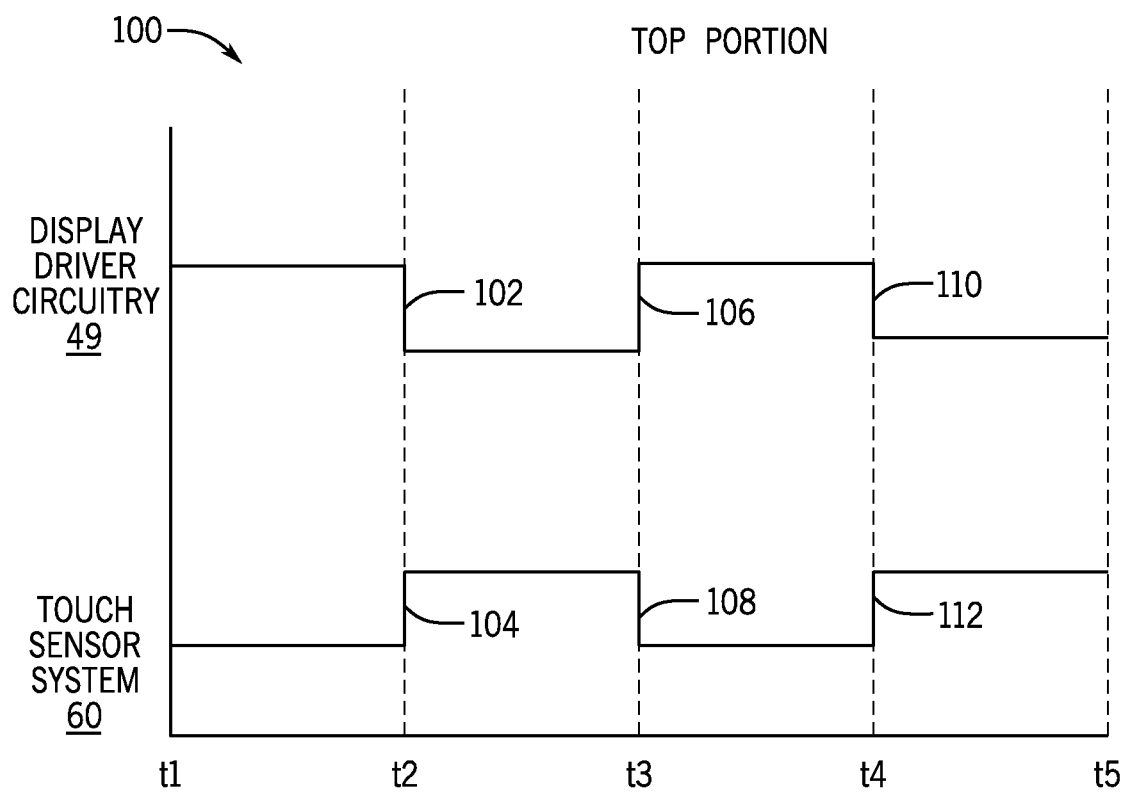
FIG. 9 is a timing diagram for alternating operation of the display driver circuitry and touch control circuitry within the top portion of the electronic display, in accordance with an embodiment.

FIG. 9 depicts a timing diagram 100 of the display driver circuitry 49 and the touch control circuitry 62 switching operation within the top portion 12a of the electronic display 12. The display driver circuitry 49 and the touch control circuitry 62 may drive different portions of the electronic display 12 to reduce or eliminate crosstalk between the display pixels 54 and the touch sensing circuitry 60. During a period t1 to t2, the display driver circuitry 49 may program the display pixels 54 in the top portion 12a while the touch control circuitry 62 may not be operating in the top portion 12a. In other words, the touch control circuitry 62 may not drive touch signals across the touch sensing circuitry 60 within the top portion 12a. This may reduce crosstalk and/or signal interference. Following a transition 102, the display driver circuitry 49 may have completed programming the display pixels 54 within top portion 12a and thus may no longer be actively programming (e.g., by data signals) the display pixels 54 in the top portion 12a. At transition 104, the touch control circuitry 62 may perform touch sensing in the top portion 12a. That is, for a period t2 to t3, the display driver circuitry 49 may not operate in the top portion 12a and the touch control circuitry 62 may operate within the top portion 12a. The touch control circuitry 62 drives the touch sensing circuitry 60 to sense user input, such as touch from a finger, a pen, or other objects. Then, the display driver circuitry 49 and the touch control circuitry 62 may switch operation within the top portion 12a. At transition 106, the display driver circuitry 49 may begin operation in the top portion 12a. Additionally, at transition 108, the touch control circuitry 62 may stop operating within the top portion 12a. At a period t3 to t4, the touch control circuitry 62 may stop operation in the top portion 12a and the display driver circuitry 49 may operate in the top portion 12a. At transition 110, the display driver circuitry 49 may stop operation in the top portion 12a, and at transition 112, the touch control circuitry 62 may restart operation in the top portion 12a. For a period t4 to t4, the display driver circuitry 49 may not operate in the top portion 12a while the touch control circuitry 62 may operate within the top portion 12a. In this way, the touch control circuitry 62 and the display driver circuitry 49 may alternate operation in the top portion 12a of the electronic display 12 to reduce or eliminate crosstalk.

With the foregoing in mind, FIG. 10 depicts the electronic display 12 at the period t1 to t2. For example, the display driver circuitry 49 may operate in the top portion 12a and the touch control circuitry 62 may operate in the bottom portion 12b. The display driver circuitry 49 may receive image data 48 and program the electronic display 12. For example, the display driver circuitry 49 may provide scan signals to control the display pixels 54 or cause a row of display pixels 54 to receive a portion of the image data 48. As such, the image frame may be programmed into the display pixels 54. Additionally or alternatively, the touch control circuitry 62 may operate in the bottom portion 12b. The touch control circuitry 62 may sense user input. As described herein, the operation of the touch control circuitry 62 may produce electrical signals, such as noise. The top portion 12a and the bottom portion 12b may connect at the boundary 80. However, the boundary 80 may prevent electrical signals (e.g., noise) from transferring between the top portion 12a and the bottom portion 12b. Indeed, scan signals from the display driver circuitry 49 may be contained within the top portion and the noise from the touch control circuitry 62 may be contained to the bottom portion 12b, which may reduce or eliminate interference crosstalk.

Further, FIG. 11 depicts the display driver circuitry 49 and the touch control circuitry 62 respectively operating on a portion of the electronic display 12 during the period t2 to t3. For example, the top portion 12a may allow for touch sensing while the bottom portion 12b may update the electronic display 12. That is, the touch control circuitry 62 may operate in the top portion 12a and sense the user input. The display driver circuitry 49 may operate in the bottom portion 12b and program the display pixels 54 with the image data 48.

While the illustrated embodiments of FIGS. 8, 10, and 11 depict the electronic display 12 split into two evenly sized portions, in an embodiment, the electronic display 12 may include multiple portions. By way of example, the electronic display 12 may be split into 4 portions in a 2×2 configuration, 6 portions in a 2×3 configuration, a 3×2 configuration, and so on. Additionally, the portions may be any suitable shape or size. For example, the electronic display 12 may be split into 3 portions, such as 1 top portion and 2 bottom portions or 2 top portions and 1 bottom portion. In another example, there may be 2 portions, a first portion and a second portion. The first portion may be larger than the second portion, or vice versa. Additionally or alternatively, the portions may be oriented in a vertical configuration (e.g., boundary 80 crossing the horizontal axis 84), horizontal configuration (e.g., boundary crossing the vertical axis 82), a diagonal configuration, or the like. Indeed, the configuration of the top portion and the bottom portion may not be in a stacked configuration, rather the top portion may be a left portion and the bottom portion may be a right portion, or vice versa.

Figure 12:
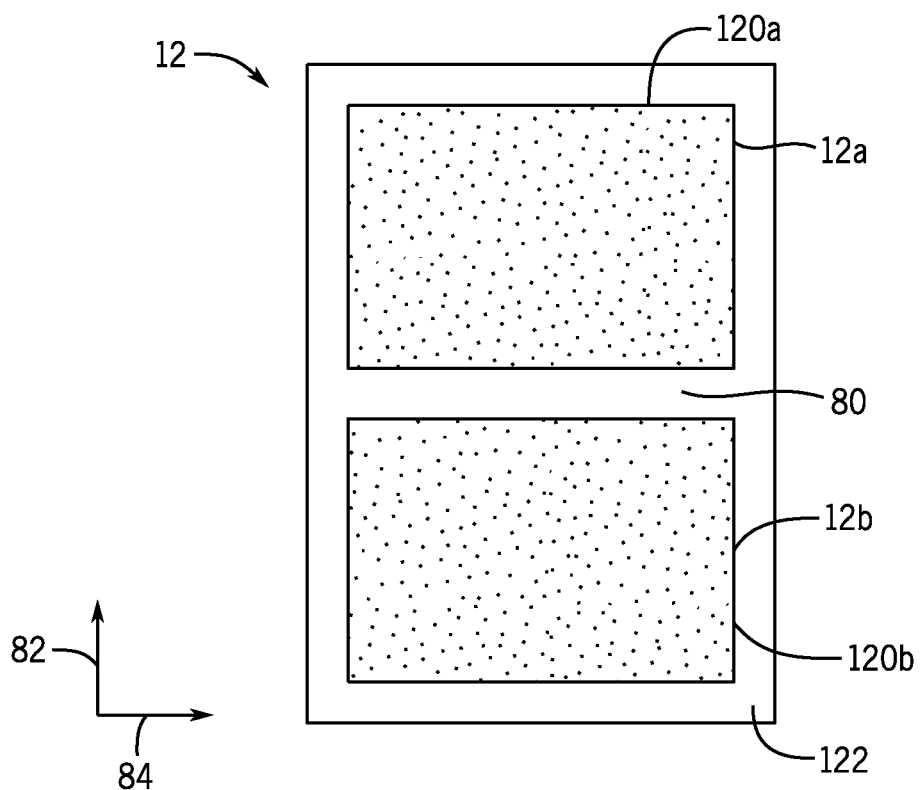
FIG. 12 is a block diagram of the electronic display with power supply circuitry split into multiple portions, in accordance with an embodiment.

FIG. 12 depicts a block diagram of an embodiment of the electronic display 12 with the voltage power supply circuitry, ELVSS 120, split into two portions. For example, during manufacturing, the ELVSS 120 may be made as a first ELVSS 120a and a second ELVSS 120b. Additionally or alternatively, the ELVSS 120 may be split into multiple portions by laser drilling, etching, heat, cutting, or the like. For example, the ELVSS 120 may split into 3, 4, 5, or more portions in any suitable shape or size.

The top portion 12a may be defined by the first ELVSS 120a and the bottom portion 12b may be defined by the second ELVSS 120b. The first ELVSS 120a and the second ELVSS 120b may not be connected; rather, the boundary 80 may be a gap formed by the first ELVSS 120a and the second ELVSS 120b. That is, the first ELVSS 120a and the second ELVSS 120b may not connect. Rather, the boundary 80 may represent the gap formed between the first ELVSS 120a and the second ELVSS 120b. In this way, the boundary 80 may provide a limited electrical pathway from the top portion 12a to the bottom portion 12b. As such, electrical signals from programming the display pixels 54 and/or performing touch sensing may be contained within the top portion 12a or the bottom portion 12b. In certain instances, the cathode may include a natural resistance of approximately 20 Ohms. As such, splitting ELVSS 120 may not result in elimination of noise reduction because the data lines 58 may couple to the cathode 122, resulting in crosstalk.

As further described with reference to FIG. 15, the boundary 80 may leave a pathway (e.g., low impedance pathway) between the top portion 12a and the bottom portion 12b. The pathway may allow some, but not all, electrical signals and/or a current to travel between the top portion 12a and the bottom portion 12b. As further discussed herein, the pathway may allow image content may be displayed at the boundary 80 without substantial image artifacts.

Figure 13:
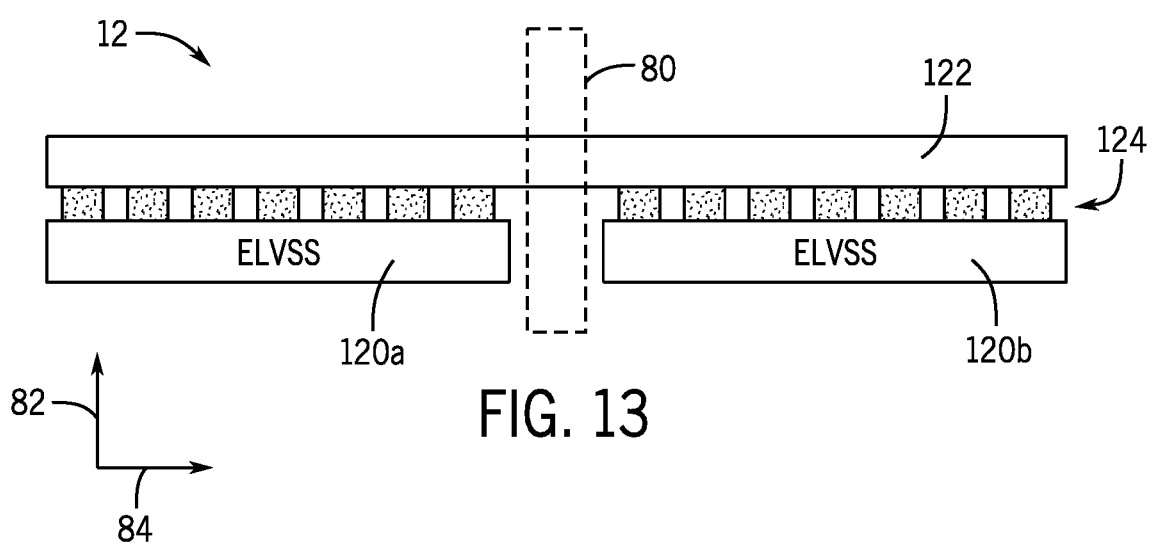
FIG. 13 is a side view of the electronic display of FIG. 12 with the power supply circuitry split into multiple portions, in accordance with an embodiment.

Returning to the ELVSS 120, the cathode 122 may receive power from the ELVSS 120 by one or more vias 124. For example, FIG. 13 depicts a side view of an embodiment of the electronic display 12 with the split ELVSS 120a, 120b coupled to the cathode 122. The ELVSS 120 and the cathode 122 may be coupled in a stacked configuration and may be electrically coupled to the cathode 122 by vias 124. In the illustrated example, the cathode 122 may be stacked on top of the ELVSS 120a, 120b. A top surface of the cathode 122 may be laser cut to form one or more vias 124 around a periphery, a center, or across the surface of the cathode 122. The vias 124 may form an interconnect to electrically couple the cathode 122 to the ELVSS 120a, 120b. In an example, the first ELVSS 120a may provide power to the cathode 122 within the top portion 12a and the second ELVSS 120b may provide power to the cathode within the bottom portion 12b, or vice versa. Further, the top surface of the cathode 122 may be patterned with multiple vias 124 such that power from the first ELVSS 120a and the second ELVSS 120b may be evenly distributed. The vias 124 may provide a low impedance path for power delivery such that power delivered at the edge of the electronic display 12 may be similar to power being delivered at the center.

Figure 14:
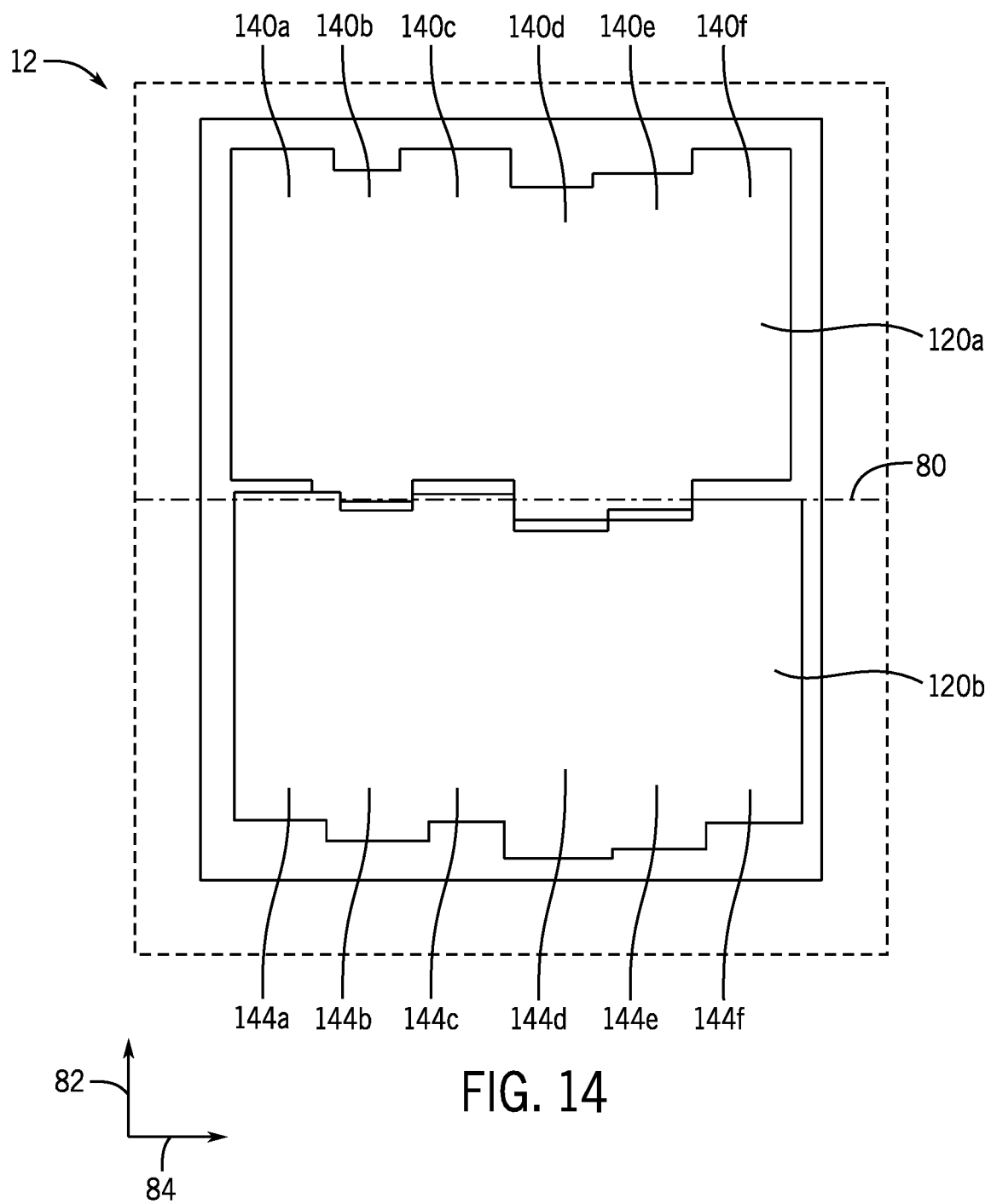
FIG. 14 is a block diagram of the electronic display split into the top portion and the bottom portions by a boundary layer, in accordance with an embodiment.

FIG. 14 is a block diagram of an example of the electronic display 12 with the first ELVSS 120a and the second ELVSS 120b further split into columns to create a zig-zag boundary 80. As described herein, the boundary 80 may be a high impedance pathway that may reduce signal transfer. As such, the image content could include front of screen image artifacts, such as a split down the middle, discontinuity in image content, or differing brightness and/or color content unless corrective techniques are used, such as those discussed herein. For example, the image content may have a line or a gap at and area associated with the boundary 80 since signal transfer may be limited. In another example, image content may be split in the middle, or at the location of the boundary 80.

Indeed, splitting the electronic display 12 into multiple portions may introduce image artifacts at the boundary 80 due to the sharp transition between the top portion 12a and the bottom portion 12b. As such, the boundary 80 may take a zig-zag pattern rather than a straight line or a gap. The zig-zag pattern of the boundary 80 may soften the transition from the top portion 12a and the bottom portion 12b.

For example, the zig-zag pattern may be created by further splitting the first ELVSS 120a and the second ELVSS 120b into multiple portions. In the illustrated embodiment, the first ELVSS 120a may be split into six portions 140a-f and the second ELVSS 120b may be split into six portions 142a-f. For example, a first column 140a of the first ELVSS 120a may be shifted slightly upwards along the vertical axis 82, or towards the top edge of the electronic display 12. Similarly, a first column 144a of the second ELVSS 120b may be shifted slightly upwards along the vertical axis 82. A second column 140b of the first ELVSS 120a may be shifted slightly downwards along the vertical axis 82 and a second column 144b of the second ELVSS 120b may be shifted downwards along the vertical axis 82. Further, a third column 140c, 144c may be shifted upwards along the vertical axis 82, a fourth column 140d, 144d may be shifted downwards along the vertical axis 82, a fifth column 140e, 144e may be shifted upwards along the vertical axis 82, and a sixth column 140f, 144f may be shifted downwards along the vertical axis 82. In this way, the boundary 80 between the first ELVSS 120a and the second ELVSS 120b may be a zig-zag instead of the straight boundary 80 described in FIGS. 8, 10, and 11.

While the illustrated example splits the first ELVSS 120a and the second ELVSS 120b into columns, different components of the display driver circuitry 49, such as the cathode 122, the data lines 58, and/or the scan lines 56, may be split to create the zig-zag boundary 80. Further, the boundary 80 may not be limited to a straight line or a zig-zag pattern; rather, the boundary 80 may be any suitable shape, size, or pattern.

Figures 15, 16:
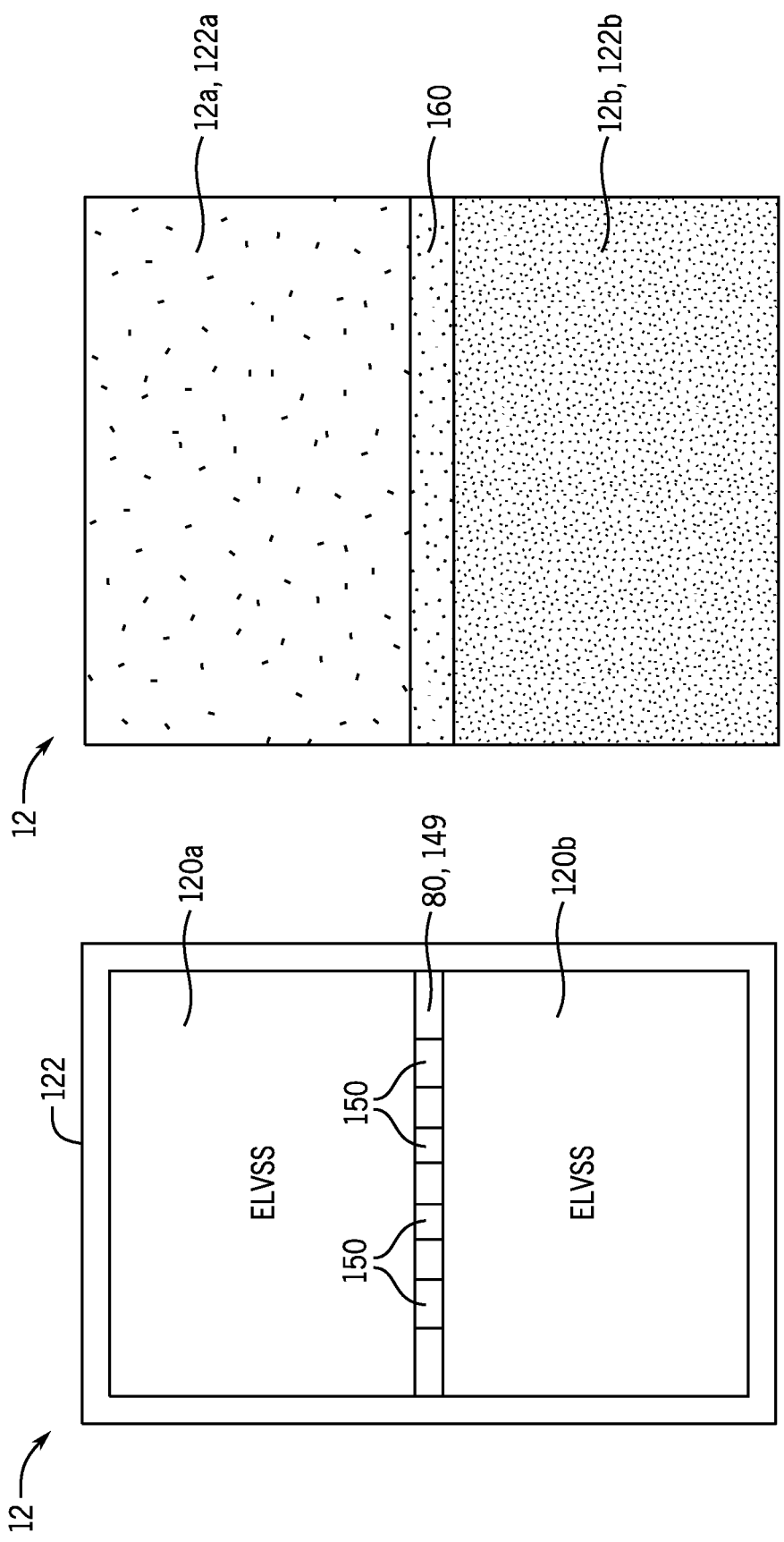
FIG. 15 is a block diagram of the electronic display split into the top portion and the bottom portions by the boundary layer, in accordance with an embodiment.
FIG. 16 is a block diagram of the electronic display including a dithering band, in accordance with an embodiment.

FIG. 15 is a block diagram of the electronic display 12 partially split between the top portion 12a and the bottom portion 12b. In an embodiment, the boundary 80 may be a connection bridge 149 that allows partial electronic signal transfer between the top portion 12a and the bottom portion 12b. The ELVSS 120 may not be completely split into the first ELVSS 120a and the second ELVSS 120b. Rather, a portion 150 of the ELVSS 120 may be removed to create the connection bridge 149. For example, laser drilling may be used to remove four portions 150 at the center of the ELVSS 120. The resulting electronic display 12 may have the connection bridge 149 at the center of the electronic display 12.

The connection bridge 149 may include one or more high impedance pathways that may prevent electrical signals from the top portion 12a and the bottom portion 12b. from spilling over (e.g., transfer). That is, the electrical signals within the top portion 12a may be contained to the top portion 12a, and electrical signals within the bottom portion 12b may be contained to the bottom portion 12b. Indeed, crosstalk between the two portions of the electronic display 12 may be reduced or eliminated. The connection bridge 149 may provide some low impedance pathways between the top portion 12a and the bottom portion 12b. That is, the sharp edge of the boundary 80 may be softened, reduced, or eliminated. As such, the electronic display 12 may maintain consistency across the boundary 80.

Still, in some examples, the electronic display 12 may include a dithering band 160 for a smoother transition between the top portion 12a and the bottom portion 12b. FIG. 16 is a block diagram of the electronic display 12 with the top portion 12a displaying a first luminance, the bottom portion 12b displaying a second luminance, and the dithering band 160. As described herein, splitting the electronic display 12 may result in image artifacts, such as a luminance difference between the top portion 12a and the bottom portion 12b. In other words, an amount of light emitted by the top portion 12a may be different from an amount of light emitted by the bottom portion 12b. To smooth or soften the transition between the top portion 12a and the bottom portion 12b, the dithering band 160 may be added. The dithering band 160 may be calibrated to the electronic display 12 (e.g., physics, properties) and/or electronic device 10. For example, the dithering band 160 may span across the horizontal axis 84 of the electronic display and at least one pixel above (e.g., 1 pixel, 2 pixels, 5 pixels, 10 pixels, 20 pixels) and at least one pixel below (e.g., 1 pixel, 2 pixels, 5 pixels, 10 pixels, 20 pixels) the boundary 80 along the vertical axis 82. The dithering band 160 may receive image data that has been dithered (e.g., alternated, oscillated, distributed) including pixel data from below the boundary 80 and above the boundary 80, to soften or smooth the transition. Additionally or alternatively, the dithering band 160 may be located above the boundary 80 along the vertical axis 82. A top edge of the dithering band 160 may have a luminance equivalent to the first luminance and a bottom edge may have a luminance equivalent to the second luminance. The luminance of dithering band 160 may have a gradient pattern transitioning between the first luminance and the second luminance. As such, the transition between the top portion 12a and the bottom portion 12b may appear smoother, or less visually perceptible.

In an embodiment, the electronic device 10 may include the cathode 122 split into multiple portions. As described herein, the cathode 122 may provide a voltage to drive the self-emissive elements of the display pixels 54 to emit light. Splitting the cathode 122 may result in different voltages applied to the self-emissive elements of the display pixels 54, which may result in a difference in light emission from the display pixels 54. For example, the top portion 12a may include a first cathode 122a and the bottom portion 12b may include a second cathode 122b. The first cathode 122a may provide a voltage to the display pixels 54 within the top portion 12a. The second cathode 122b may provide a second voltage to the display pixels 54 within the bottom portion 12b. The first voltage and the second voltage may be different due to the split, as such the luminance of the top portion 12a and the bottom portion 12b may be different. Indeed, the luminance of the electronic display 12 may be sensitive to changes made to the cathode 122. In one example, there may be a 0.3% change per millivolt (mV) at 0.2 nits. In another example, the electronic display 12 may experience 1% change per 6 mV at 0.2 nits.

With the foregoing in mind, the cathode 122 may be thinned to split the cathode 122 into the first cathode 122a and the second cathode 122b. The thinned cathode 122 may create a continuous positive taper structure at the center and split the electronic display 12 into the top portion 12a and the bottom portion 12b. Although the cathode 122 may not be entirely split, thinning the cathode 122 may result in higher impedance at the boundary 80 to prevent electrical signal transfer. However, certain low impedance pathways may remain in portions of the cathode 122 that may not be thinned.

Figure 17:
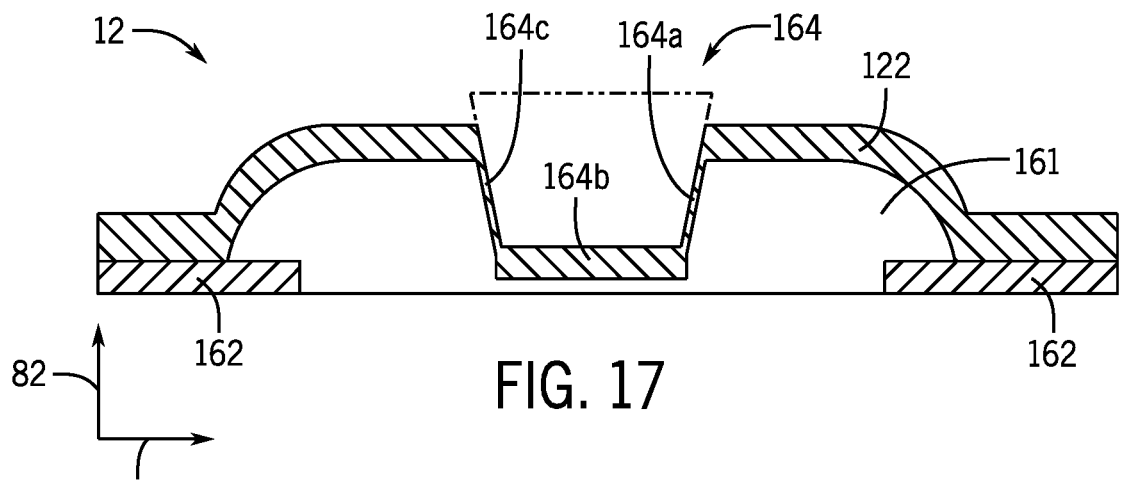
FIG. 17 is a block diagram of a cathode cut in a positive taper structure, in accordance with an embodiment.

With the foregoing in mind, FIG. 17 depicts an embodiment of the electronic display 12 including the cathode 122 in a positive taper structure 164 to form the boundary 80. The electronic display 12 may include the cathode 122, a pixel define layer (PDL) 161, and an anode 162. The PDL 161 may act as an insulating film between the anode 162 and the cathode 122. To form the boundary 80, certain portions of the cathode 122 may be thinned 50-70% to form the positive taper structure 164. The thinned portions of the cathode 122 may increase impedance between the top portion 12a and the bottom portion 12b or the first cathode 122a and the second cathode 122b.

The cathode 122 may be thinned into one or more portions to create the positive taper structure 164. The positive taper structure 164 may be formed from a first segment 164a, a second segment 164b, and a third segment 164c of the cathode 122. The first segment 164a may connect to the second segment 164b. The first segment 164a may be a slope of the positive taper structure 164 that may be less than 90 degrees. The angle measurement may be taken relative to the horizontal axis 84. The second segment 164b may be horizontal with respect to the horizontal axis 84. That is, the second segment 164b may be the bottom of the positive taper structure 164. The second segment 164b may be connected to a third segment 164c, which may be a second slope of the positive taper structure 164. The slope of the third segment 164c may be less than 90 degrees. As such, the positive taper structure 164 may include a taper angle greater than 90 degrees. Accordingly, in an embodiment, the cathode 122 may be split with one or more positive taper structures 164 across the center.

In the illustrated embodiment, the first segment 164a and the third segment 164c may have a similar angle, which may be less than 90 degrees, however, in an embodiment, the first segment 164a and the third segment 164c may have different angles, may be different lengths, or different heights. Indeed, the positive taper structure 164 may be any suitable size or shape to create the boundary 80.

Figure 18:
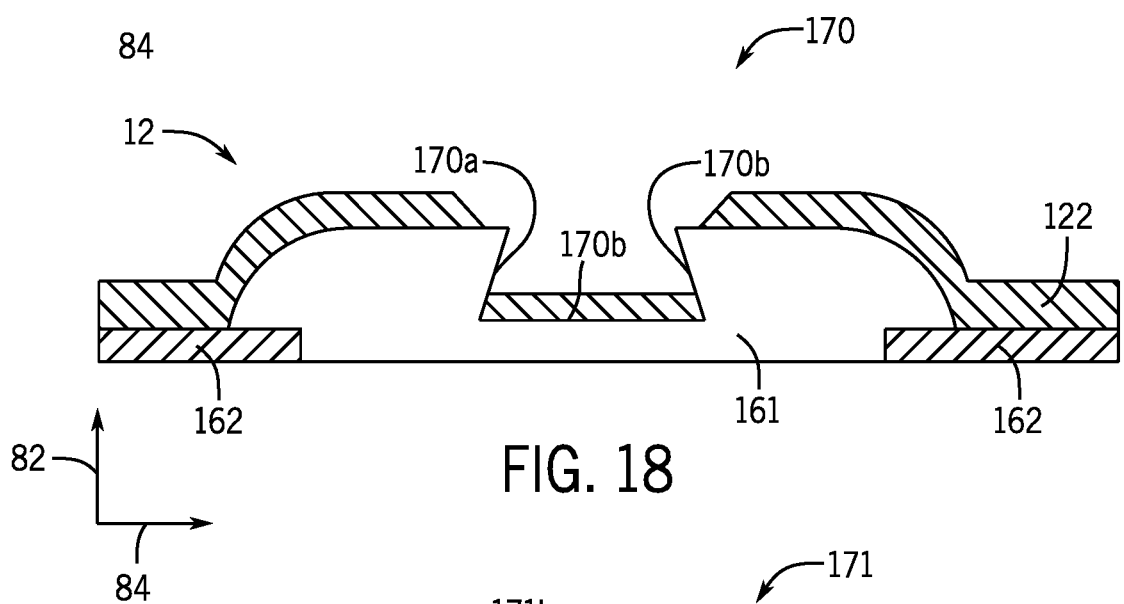
FIG. 18 is a block diagram of the cathode cut in the positive taper structure, in accordance with an embodiment.

In an embodiment, certain portions of the cathode 122 may be disconnected to form the boundary 80. FIG. 18 is a block diagram of a disconnected cathode 122 in a negative taper structure 170 that may be in the electronic display 12. The negative taper structure 170 may be formed by fully disconnecting a portion of the cathode 122. Indeed, the cathode 122 may be cut twice to form the negative taper structure 170. For example, the negative taper structure 170 may be formed with a first segment 170a, a second segment 170b, and a third segment 170c. The first segment 170a may be cut into the PDL 161 to fully disconnect a portion of the cathode 122. The first segment 170a may be sloped greater than 90 degrees, relative to the horizontal axis 84. The first segment 170a may be connected to the second segment 170b, which may include a portion of the cathode 122. The second segment 170b may be connected to the third segment 170c. The third segment 170c may include the PDL 161 and may be sloped greater than 90 degrees. As such, the positive taper structure 164 may include a taper angle less than 90 degrees. The cathode 122 may be cut across the center to form one or more negative taper structures 170 to split the cathode 122. In this way, the cathode 122 may recess into the PDL 161 to create the negative taper structure 170.

In some examples, the cathode 122 may extend from the PDL 161 to create the negative taper structure 170. For example, the PDL 161 may be filled or raised in order to disconnect a portion of the cathode 122. The negative taper structure 170 may include the first segment 170a, the second segment 170b, and the third segment 170c. Indeed, the first segment 170a and the third segment 170c may include a slope greater than 90 degrees, while the second segment 170b may be a horizontal portion of the cathode 122 that may be raised by the PDL 161. In this way, the cathode 122 may extend above the PDL 161, thereby creating a high impedance pathway.

Figure 19:
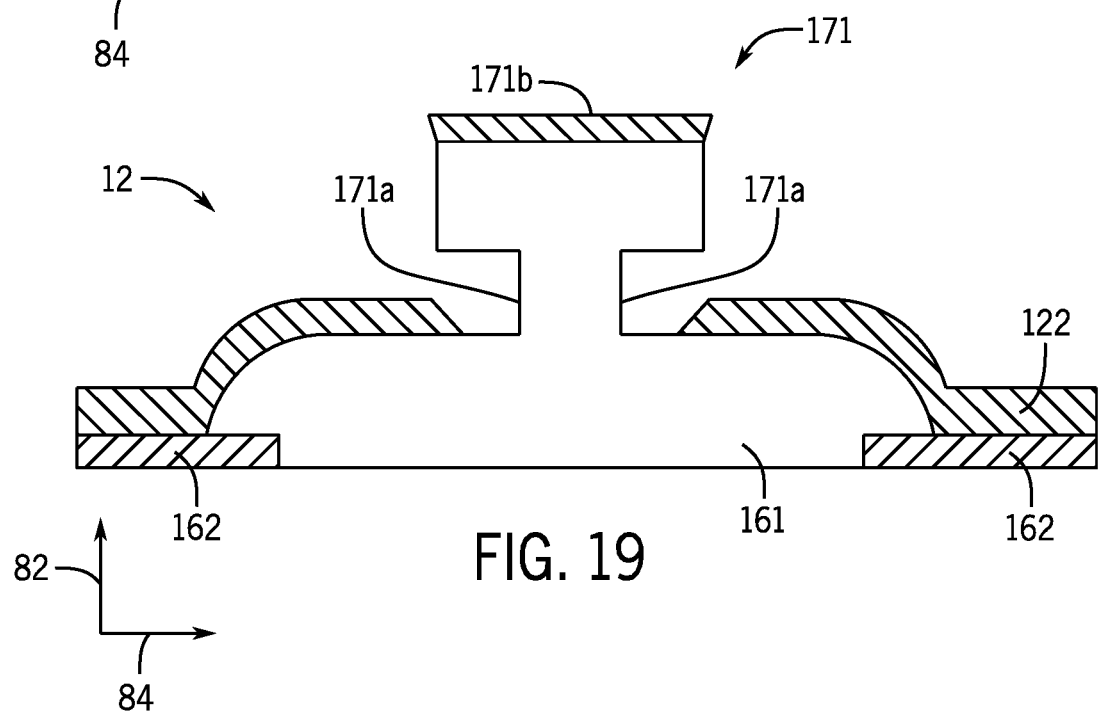
FIG. 19 is a block diagram of the cathode cut in an undercut, in accordance with an embodiment.

Still, in another example, the cathode 122 may be disconnected in an undercut structure 171. In the illustrated example of FIG. 19, the undercut structure 171 may look like a "T" however the undercut structure 171 may be any shape or size with a raised PDL 161. Indeed, the undercut structure 171 may be formed by fully disconnecting the cathode 122 and raising a portion of the PDL 161. For example, the undercut structure 171 may include a first segment 171a, a second segment 171b, and a third segment 171c. The first segment 171a and the third segment 171c may be formed by cutting the cathode 122 at an angle and raising a portion of the PDL 161. The raised portion of the cathode 122 may be the second segment 171b of the undercut structure 171. For example, the second segment 171b may be raised 100 nanometers (nm) or higher to ensure that the cathode 122 is fully disconnected. A portion of the cathode 122 underneath the second segment 171b may be removed to form the undercut structure 171. In the illustrated example, the first segment 171a and the third segment 171c may include a ninety-degree angle, however, in other examples the first segment 171a and the third segment 171c may include an angle less than 180 degrees. Cutting the cathode 122 to create the positive taper structure 164, the negative tapered structure 170, or the undercut structure 171 may create multiple high impedance pathways, thereby reducing or preventing electrical signal transfer between the portions of the electronic display 12.

In some examples, the cathode 122 may be disconnected with a single cut across the center. As described in reference to FIG. 8, the top portion 12a and the bottom portion 12b may be separated by a straight line. Indeed, the cathode 122 may include one continuous cut in a straight line, rather than the positive taper structure 164 described in reference to FIG. 17 or the negative taper structure 170 described in reference to FIG. 18. In another example, the cathode 122 may be split in the center by a pattern. For example, the cathode 122 may be cut with a stipple pattern, a zig-zag pattern, a perforation, or the like. By splitting the cathode 122, attenuation (e.g., high impedance pathways) may be introduced at the boundary 80, which may prevent signal transfer and/or power transfer.

Figure 20:
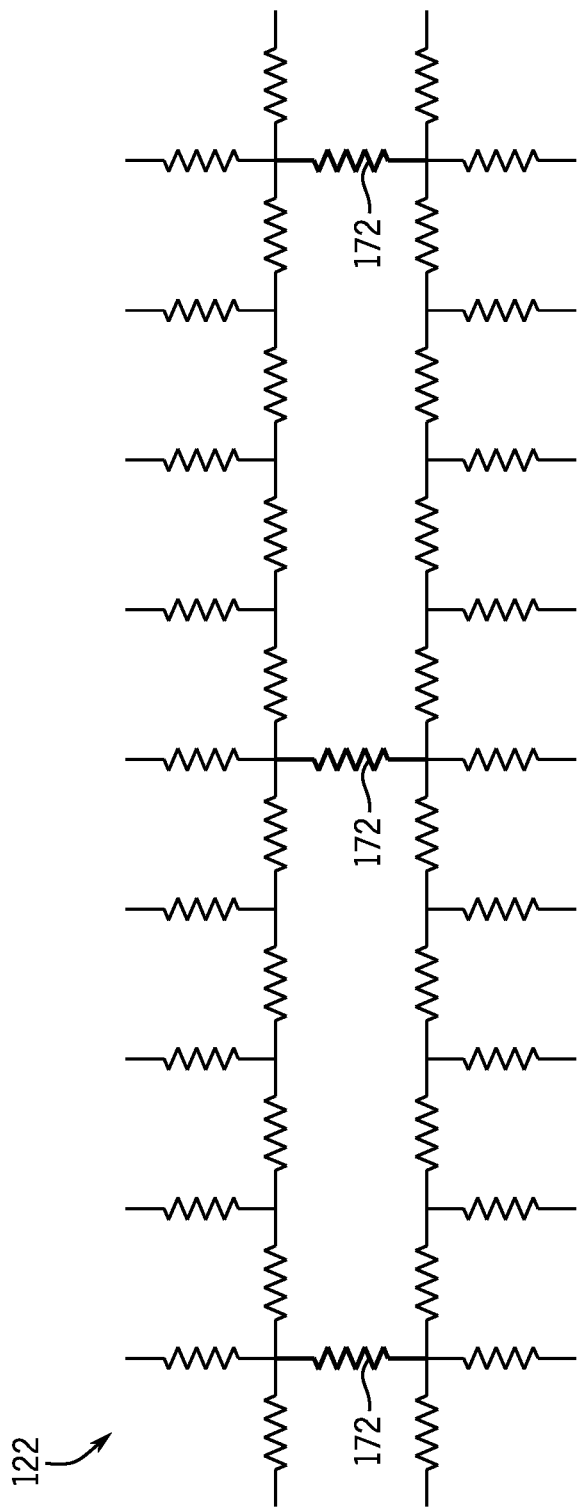
FIG. 20 is a circuit diagram of the cathode in a stipple pattern, in accordance with an embodiment.

In an example, the cathode 122 may be cut in the stipple pattern. FIG. 20 is a circuit view of the cathode 122 in a stipple pattern. The stipple pattern may create uniformity across the boundary 80. In the illustrated embodiment, the cathode 122 may include one or more connection points 172 that provides for signal transfer. The connection points 172 may be spaced out between four connections. However, the connection points 172 may be spaced out between any suitable number of connections.

Figure 21:
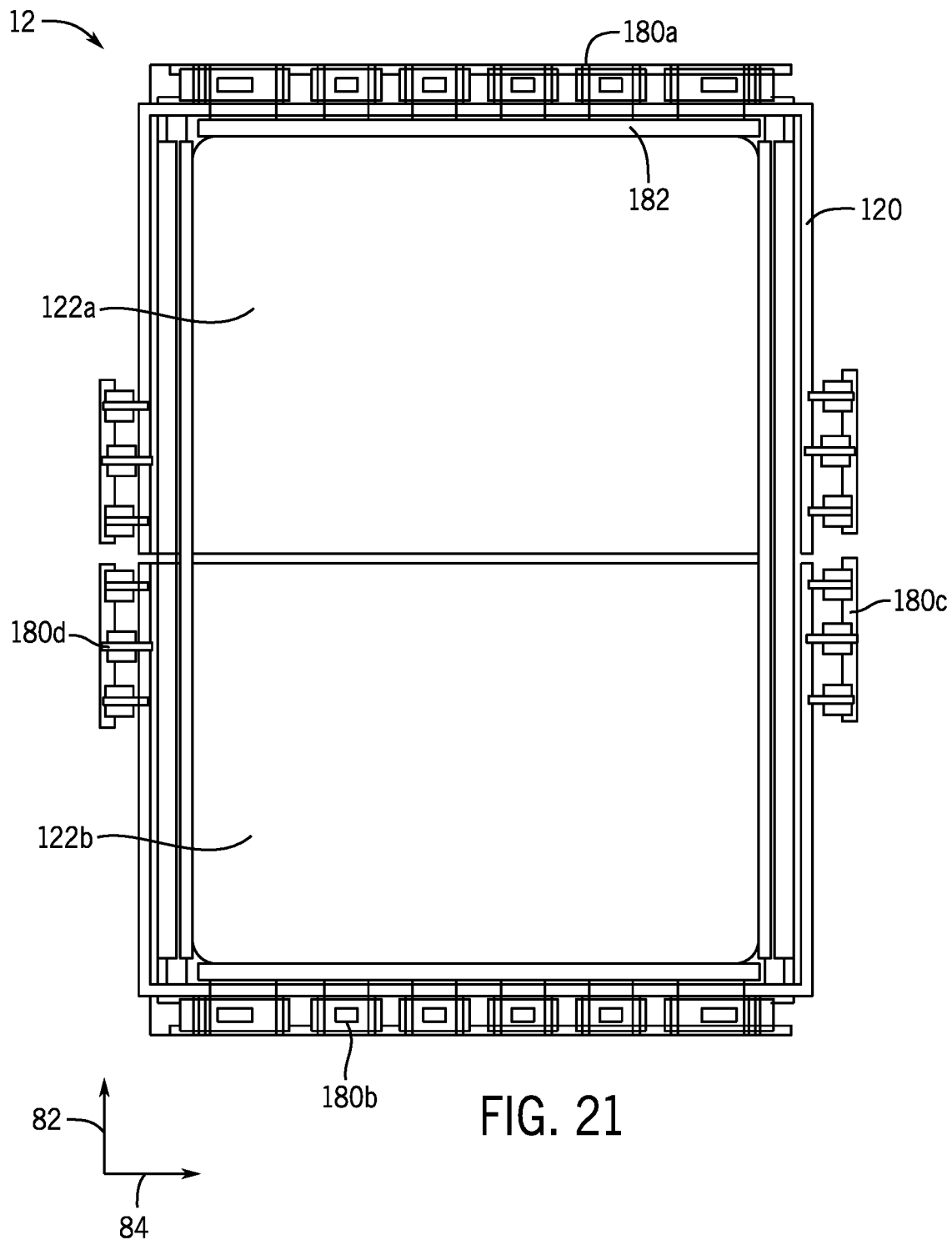
FIG. 21 is a block diagram of the electronic display with ELVSS perimeter routing and multiple vias for power delivery, in accordance with an embodiment.

FIG. 21 is a block diagram of an embodiment of routing power within the electronic display 12 with the cathode 122 split into multiple portions. As described herein, the ELVSS 120 may be coupled and provide power to the cathode 122. When the cathode 122 may be split, it may be beneficial for the ELVSS 120 to evenly distribute power to a first cathode 122a and a second cathode 122b to prevent image artifacts. As such, it may be beneficial for a power management integrated circuit (PMIC) 180 to drive the ELVSS 120 to provide power at all four edges of the electronic display 12. For example, the top edge of the electronic display 12 may include a top PMIC 180a. The top PMIC 180a may be located on a printed circuit board (PCB) and bonded (e.g., bonded flex) to the electronic display 12 (e.g., active area 55) by any suitable number of connection points. The top PMIC 180a may drive the ELVSS 120 to provide power to the first cathode 122a. The top PMIC 180a may also drive the ELVDD 182 to provide power to the anode 162. In this way, the display pixels 54 may receive power to emit light. Additionally, the bottom edge of the electronic display 12 may include a bottom PMIC 180b, which may operate in a similar manner as the top PMIC 180a. Additionally or alternatively, the top PMIC 180a and the bottom PMIC 180B may be coupled to row driving gate in panel (GIP) circuitry and/or other power signals (e.g., OLED power signals).

The electronic display 12 (e.g., active area 55) may also include a right PMIC 180c and a left PMIC 180d. The right PMIC 180c and the left PMIC 180d may also be printed on PCB and bonded to a left center or a right center of the electronic display 12. The right PMIC 180c and the left PMIC 180d may be responsible for driving the ELVSS 120 to provide power to the first cathode 122a and the second cathode 122b. The cathode 122 may have a natural resistance of 20 Ohms. As power travels from the edge of the cathode to the center, the power may decrease. Therefore, driving the ELVSS 120 from all edges of the electronic display 12 may improve voltage differences within the cathode 122 (or due to a split when the cathode 122 is a split cathode). As such, image artifacts may be reduced or eliminated.

Further, the ELVSS 120 may be added to a perimeter of the electronic display 12 to route and deliver power to the first cathode 122a and the second cathode 122b. As described here, providing power to multiple points of the cathode 122 may lower impedance and differences in voltage, thereby reducing the discontinuity (e.g., boundary 80) at the center of the electronic display 12. The points of power delivery may be anchor points or calibration nulls that may help mitigate noise in the center of the electronic display 12. That is, the edges of the cathode 122 may be a reference point or a portion with little to no noise. Moving from the edge to the center of the cathode 122, the resistance of the cathode 122 may increase. In other words, the center of the cathode 122 may have a higher impedance in comparison to the edges. This may result in higher noise in the center of the electronic display 12. In this way, power delivery may be evenly distributed throughout the first cathode 122a and the second cathode 122b, thereby reducing or eliminating visible image artifacts.

To add additional points of power delivery, vias 124 may be patterned on the surface of the cathode 122 to improve power delivery and lower impedance. The vias 124 may provide low impedance pathways from the ELVSS 120 to the cathode 122. The ELVSS 120 may be tied to the cathode 122 and power may be delivered directly to the center of the cathode 122, which may lower the impedance of the cathode 122. Lowering the impedance of the cathode 122 may allow the display driver circuitry 49 to get gains and suppress electrical signals generated by the touch control circuitry 62.

Figure 22:
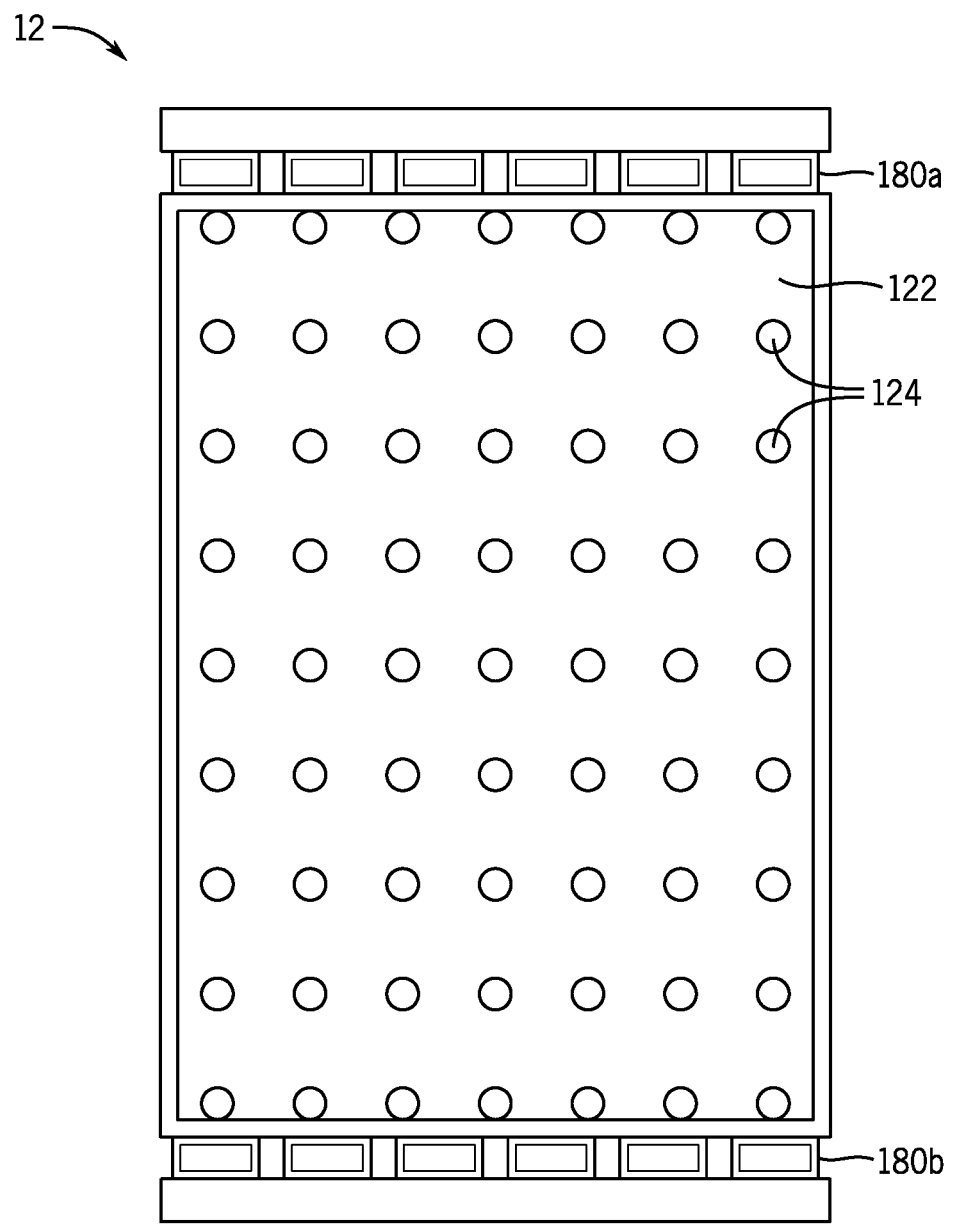
FIG. 22 is a block diagram of the electronic display with center grounding and multiple vias, in accordance with an embodiment.

FIG. 22 is an example of the electronic display 12 with vias 124 patterned across the surface of the cathode 122. The top PMIC 180a and the bottom PMIC 180b may drive the ELVSS 120 to provide power to the cathode 122. As described in reference to FIG. 13, the vias 124 may go from the cathode 122 to the ELVSS 120 to form the electrical connection. The vias 124 may provide a low impedance pathway for power delivery, which may reduce noise or signal transfer of the electronic display 12.

Returning to FIG. 22, the surface of the cathode 122 may be patterned with the vias 124 to lower the impedance of the cathode 122 by providing multiple low impedance pathways for the power to be delivered from the ELVSS 120 to the cathode 122. The vias 124 may be in a grid pattern along the vertical axis 82 and the horizontal axis 84. In this way, power may be evenly distributed to the cathode 122. During operation, the noise may be concentrated in the center of the electronic display 12 and the edges may experience little to no noise. The maximum noise may be measured by measuring the noise on scan lines 56 and the data lines 58.

Figure 23:
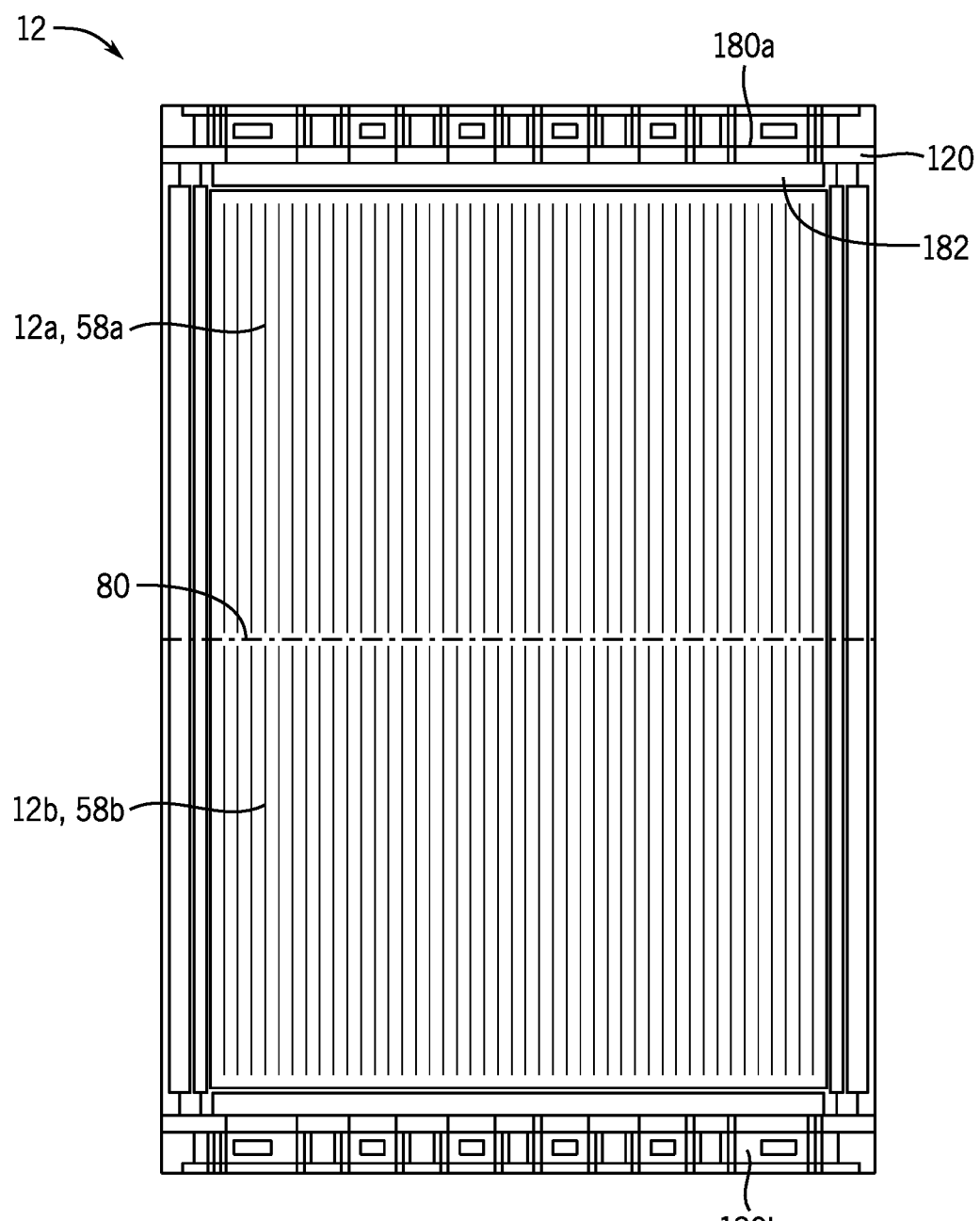
FIG. 23 is a block diagram of the electronic display with split data lines, in accordance with an embodiment.

Additionally or alternatively, the electronic display 12 may include split data lines 58. The display pixels 54 may be connected to data lines 58 within different portions of the electronic display 12. Further, the electronic display 12 may include multiple data drivers 52 to program the split data lines 58. For example, the top portion 12a of the electronic display 12 may include display pixels 54 connected to the top data lines 58 and the bottom portion 12b of the electronic display 12 may include display pixels 54 connected to bottom data lines 58. In an embodiment, the data driver 52 may be split into a top data driver to program the display pixels 54 in the top portion 12*a* and a bottom data driver to program the display pixels 54 in the bottom portion 12*b*. With the foregoing in mind, FIG. 23 is a block diagram of an embodiment of the electronic display 12 with split data lines 58. For example, the touch sensing circuitry 60 may operate in the top portion 12*a*. Noise from the touch sensing circuitry 60 may couple to the cathode 122, but the noise may smear due to the impedance of the cathode 122. For example, the noise may be concentrated in the top portion 12*a* and smear into the bottom portion 12*b*. Baseline sniffing of noise from the bottom portion 12*b* may be performed to reduce or eliminate noise in the top portion 12*a*. For example, the touch control circuitry 62 may operate in the top portion 12*a* to detect the user input. The touch control circuitry 62 may also operate in the bottom portion 12*b* to obtain, or "sniff," a baseline parameter of noise. As such, the baseline parameter of noise may be filtered (e.g., subtracted) from the noise within the top portion 12*a*. In this way, the noise may be reduced or eliminated. The noise in the bottom portion 12*b* may not be as intense or as high. Indeed, the noise may be concentrated in the middle of the electronic display 12 with the least noise at the bottom edge of the electronic display 12. However, by splitting the data lines 58 and performing baseline sniffing, overall noise may be reduced significantly (e.g., by a factor of 2 or more).

Additionally or alternatively, active cancellation may be applied to a portion of the electronic display 12 to reduce or eliminate noise. For example, the touch control circuitry 62 may operate in the top portion 12*a* and produce noise (e.g., touch driving signal). A mitigation signal may be applied on a top data line 58 where the touch control circuitry 62 may be operating. The mitigation signal may be determined and calculated from various locations of a data path (e.g., SoC, timing controller integrated circuitry, a column driver, data lines 58). For example, the mitigation signal may be a waveform for noise cancellation. The mitigation signal may be applied to the top data lines 58 to counteract interference from the bottom data line 58, or a data line 58 in a different portion of the electronic display 12. For example, the mitigation signal may be an inverted waveform of the interference from the bottom data line 58 applied to the top data lines 58. The noise may be concentrated at the center of the top portion 12*a* and the center of the bottom portion 12*b*. The noise may be reduced or eliminated at the boundary 80. The overall noise may be reduced significantly (e.g., by a factor of 3 or more).

Figure 24:
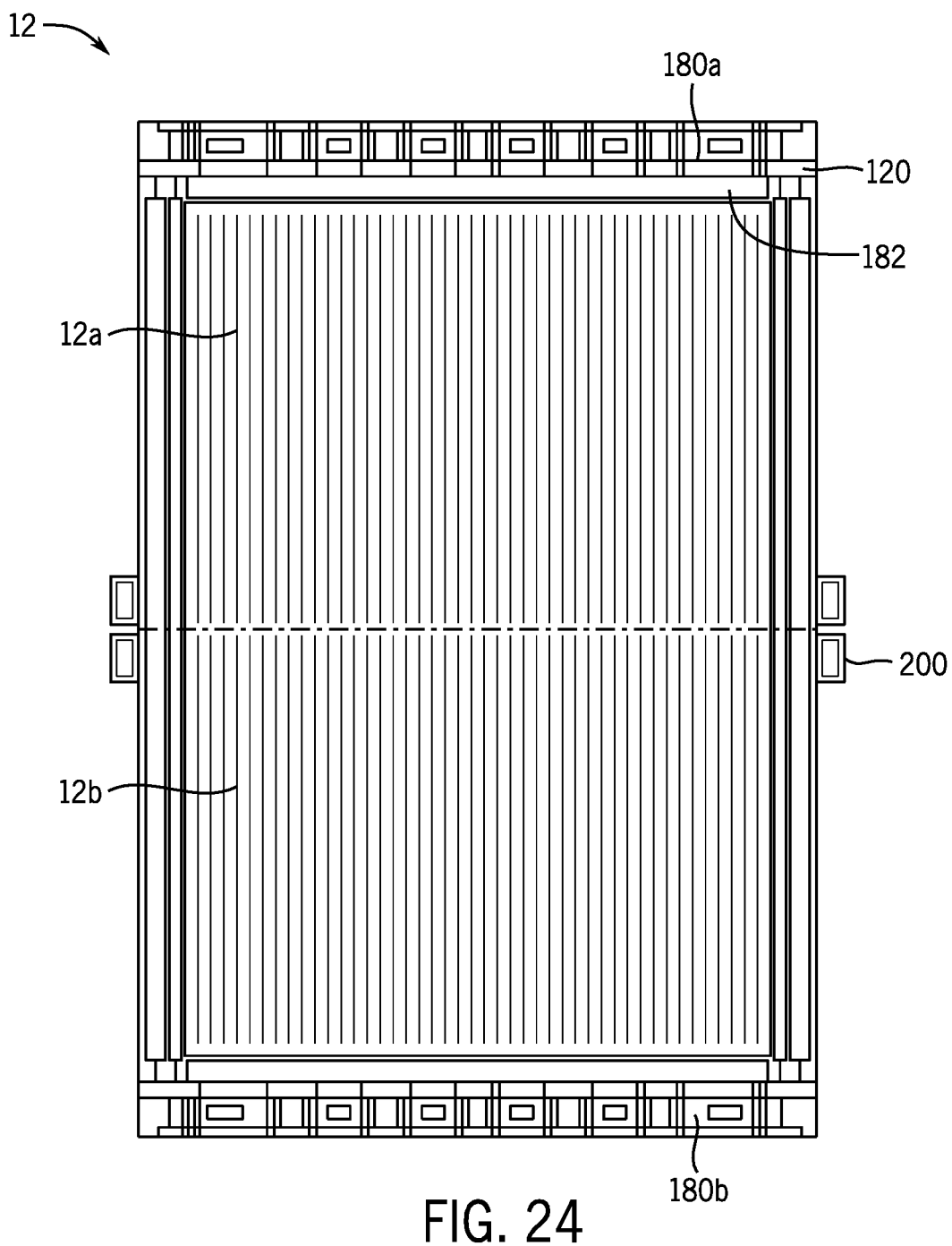
FIG. 24 is a block diagram of the electronic display with split data lines and center grounding, in accordance with an embodiment.

FIG. 24 is a block diagram of an embodiment of the electronic display 12 with split data lines 58 and center grounding. For example, ELVSS ground 200 may be placed at the center of the left side and the right side of the electronic display 12 to reduce noise. The ELVSS ground 200 may be a copper element, a connector pin, one or more integrated circuit chips, decoupling capacitors, or the like. For example, the ELVSS ground 200 may be a copper piece on a PCB that may be bonded (e.g., bonded flex) to the electronic display 12. The ELVSS ground 200 may reduce the noise by a factor of 1.5 to 2. With the ELVSS ground 200, the noise may be concentrated in a portion of the electronic display 12 where the touch sensing circuitry 60 may be operating. For example, if the touch control circuitry 62 may drive the touch sensing circuitry 60 within the top portion 12*a*, as such the noise may be concentrated in the top portion 12*a*. The noise may smear from the top portion 12*a* to the bottom portion 12*b*. With baseline sniffing and/or active cancellation, the overall noise may be reduced substantially.

Figure 25:
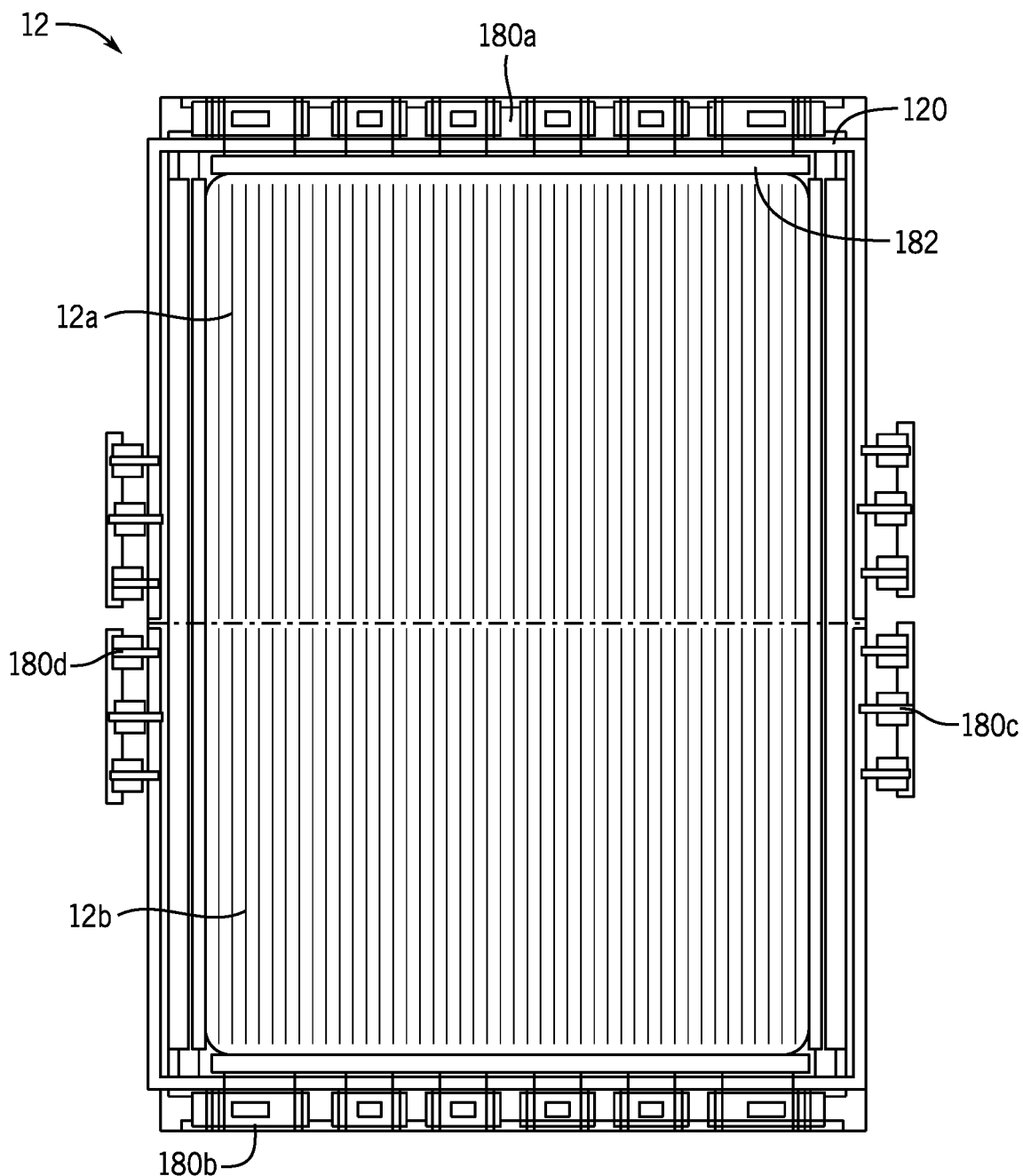
FIG. 25 is a block diagram of the electronic display with split data lines, center grounding, ELVSS perimeter routing, and vias, in accordance with an embodiment.

FIG. 25 is a block diagram of an example of the electronic display 12 with the cathode 122 split, the ELVSS 120 split, a perimeter ELVSS 120, and multiple vias 124. The cathode 122 may be split with either the positive taper structure described in reference to FIG. 17, the negative taper structure described in reference to FIG. 18, and/or the stipple pattern described in reference to FIG. 20. When the touch sensing circuitry 60 and the touch control circuitry 62 operate in different portions of the electronic display 12, the overall noise may be reduced significantly.

Figure 26:
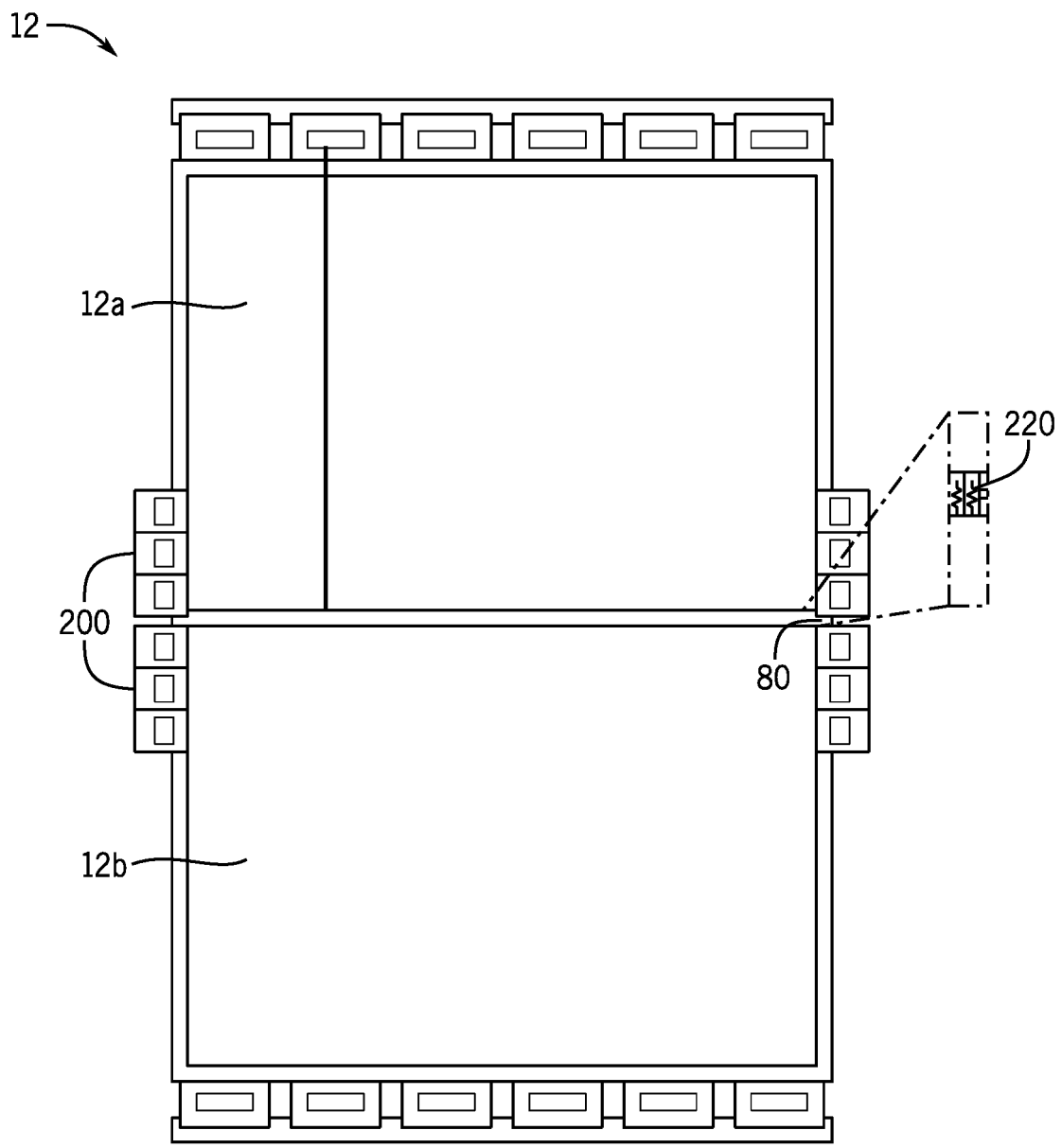
FIG. 26 is a block diagram of the electronic display with an effective resistance between the top portion and the bottom portion, in accordance with an embodiment.

FIG. 26 is a block diagram of an embodiment of the electronic display 12 with split data lines 58, split ELVSS 120, and split cathode 122. The electronic display 12 may also include the ELVSS ground 200 on the left edge and the right edge to ground the voltage of the cathode 122. The electronic display 12 may also include one or more resistors 220 to change an effective resistance between the top portion 12*a* and the bottom portion 12*b*. The resistors 220 may be located within the boundary 80 and increase the impedance. As such, electrical signals may not transfer through the boundary 80, rather the signals may be contained within the top portion 12*a* and the bottom portion 12*b*. As such, crosstalk or noise within the active area 55 may be reduced or eliminated.

In an embodiment, the electronic display 12 may include the resistors 220 with an effective resistance (Rsplit) of 0 Ohms. The electronic display 12 may also include the ELVSS ground 200 coupled to the center. When the effective resistance may be 0 Ohms, the noise may smear from the top portion 12*a* to the bottom portion 12*b*, or vice versa. That is, an amount of noise from the touch control circuitry 62 may couple to the cathode 122 and interfere with the scan signals. Indeed, this noise pattern may be similar to the electronic display 12 with the split data line 58, shown in FIGS. 21 and 22. The overall noise may be reduced significantly.

In an embodiment, the resistors 220 of the boundary 80 may have an Rsplit of 200 Ohms. The top portion 12*a* may be driven by the display driver circuitry 49 or the touch control circuitry 62. When Rsplit is 200, electrical signals may not transfer through the boundary 80. As such, the noise may be contained to the top portion 12*a*. As such, the bottom portion 12*b* may not experience any noise. The overall noise may be reduced significantly.

In an embodiment, the resistors 220 of the boundary 80 may have an Rsplit of 1 kOhms. As described herein, the boundary 80 may provide high impedance, as such there may be no signal transfer from the top portion 12*a* to the bottom portion 12*b*. The noise may be contained within the top portion 12*a* of the electronic display 12. The noise may be concentrated at a center of the top portion 12*a*, while the bottom portion 12*b* may not experience any noise. The overall noise may be reduced significantly (e.g., by a factor of 60 or more).

In an embodiment, the display driver circuitry 49 may split the ELVSS 120. The resistors 220 may have an Rsplit equal to 10 kOhm. The top portion 12*a* may be driven by the display driver circuitry 49 or the touch control circuitry 62. The noise may be pushed to the top portion 12*a* and concentrated close to the boundary 80. The edges of the top portion 12*a* may experience little to no noise. The bottom portion 12*b* may achieve reduced or eliminated noise. The overall noise may be reduced significantly (e.g., by a factor of 1 or more). Accordingly, splitting the display driver circuitry 49 may reduce or eliminate crosstalk or noise between the display driver circuitry 49 and the touch control circuitry 62. Further, the addition of the dithering band and/or the connection bridge 149 may reduce or eliminate the front of screen artifact.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display, comprising:
a touch sensing system configured to perform touch sensing in an active area of the electronic display;
display driver circuitry configured to program display pixels of the active area to emit light; and
the active area, wherein the active area comprises a first portion and a second portion of the active area that are at least partially electrically separated, and wherein the display driver circuitry is configured to program the display pixels in the first portion while the touch sensing system performs touch sensing in the second portion, and wherein the first portion comprises a first portion of a cathode and the second portion comprises a second portion of the cathode.

2. The electronic display of claim 1, wherein the display driver circuitry is configured to program the display pixels in the second portion and the touch sensing system is configured to perform touch sensing in the first portion to prevent or reduce crosstalk between the display pixels and the touch sensing system.

3. The electronic display of claim 1, wherein the first portion of the cathode and the second portion of the cathode are separated by a thinned portion of the cathode that increases an impedance between the first portion of the cathode and the second portion of the cathode.

4. The electronic display of claim 3, wherein the thinned portion of the cathode is a positive taper structure.

5. The electronic display of claim 4, wherein the positive taper structure has a taper-angle of less than 90 degrees.

6. The electronic display of claim 3, wherein the thinned portion of the cathode is a negative taper structure that disconnects a portion of the cathode to increase the impedance between the first portion of the cathode and the second portion of the cathode.

7. The electronic display of claim 3, wherein the thinned portion of the cathode comprising stipple cathode connections of the cathode configured to increase the impedance of the cathode.

8. The electronic display of claim 1, comprising a boundary area that at least partially electrically separates the first portion and the second portion.

9. The electronic display of claim 8, wherein the boundary area comprises a connection bridge to increase an impedance between the first portion and the second portion.

10. The electronic display of claim 8, wherein the boundary area comprises a zig-zag pattern to obscure a difference in behavior between the first portion and the second portion.

11. The electronic display of claim 8, wherein the boundary area comprises one or more resistors to increase an effective resistance between the first portion and the second portion.

12. The electronic display of claim 11, wherein the first portion and the second portion are completely electrically separated.

13. The electronic display of claim 1, wherein a power source supply circuitry is located around a perimeter of the active area and configured to provide a voltage to the cathode to lower an impedance of the cathode.

14. The electronic display of claim 13, comprising multiple vias on a surface of the cathode to couple the cathode to the power source supply circuitry, wherein each via of the multiple vias provides a parallel pathway for the voltage.

15. The electronic display of claim 14, comprising a voltage grounding element configured to supply a ground to a center of an edge of the active area.

16. A method, comprising:
during a first period of time, programming first display pixels connected to first data lines located within a first portion of an electronic display but not a second portion of the electronic display, wherein the first portion comprises a first portion of a cathode; and
during a second period of time not overlapping with the first period of time, programming second display pixels connected to second data lines located within the second portion of the electronic display, wherein the second portion comprises the second portion of the cathode, but not the first portion of the electronic display.

17. The method of claim 16, comprising:
during the first period of time, performing touch sensing in the second portion of the electronic display; and
during the second period of time, performing touch sensing in the first portion of the electronic display.

18. The method of claim 16, comprising:
receiving a mitigation signal, wherein the mitigation signal comprises a waveform configured to enable noise cancellation; and
during the first period of time, applying the mitigation signal to the second data lines to counteract noise generated by performing touch sensing.

19. The method of claim 18, comprising:
during the second period of time, applying the mitigation signal to the first data lines to counteract the noise generated by performing touch sensing.

20. The method of claim 16, comprising:
performing touch sensing in the first portion and the second portion of the electronic display;
identifying a baseline parameter of noise within the first portion of the electronic display; and
filtering the baseline parameter of noise from a noise of the second portion of the electronic display.

21. An electronic device, comprising:
  processing circuitry configured to generate image data; and
  an electronic display configured to program the image data into a first area of the electronic display while performing touch sensing in a second area of the electronic display that is at least partially electrically separated from the first area, wherein the first area comprises a first portion of a cathode and the second area comprises a second portion of the cathode.

22. The electronic device of claim 21, wherein the processing circuitry generates the image data to include a dithered area around a boundary between the first area and the second area.

23. The electronic device of claim 21, wherein a size of the first area and a size of the second area are the same.

24. The electronic device of claim 21, wherein a size of the first area and a size of the second area are different sizes.

25. The electronic device of claim 21, wherein the first area and the second area connect at a boundary, and wherein the boundary is parallel to a horizontal axis.

26. The electronic device of claim 21, wherein the electronic display is configured to perform touch sensing in the first area of the electronic display while programming image data into the second area of the electronic display.

27. The electronic device of claim 21, comprising a third area and a fourth area, wherein the electronic display is configured to program the image data into the third area while performing touch sensing in the second area of the electronic display.

* * * * *